(12) United States Patent
Hao et al.

(10) Patent No.: US 9,407,968 B2
(45) Date of Patent: Aug. 2, 2016

(54) MULTICAST AND UNICAST ADAPTIVE BITRATE SERVICES

(71) Applicant: Verizon Patent and Licensing Inc., Arlington, VA (US)

(72) Inventors: Jianxiu Hao, Acton, MA (US); Jian Huang, Sudbury, MA (US); Dongchen Wang, Concord, MA (US); Michael P. Ruffini, Methuen, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 14/578,679

(22) Filed: Dec. 22, 2014

(65) Prior Publication Data

US 2016/0182966 A1    Jun. 23, 2016

(51) Int. Cl.
    H04N 7/173       (2011.01)
    H04N 21/6405     (2011.01)
    H04N 21/234      (2011.01)
    H04N 21/235      (2011.01)

(52) U.S. Cl.
    CPC ......... *H04N 21/6405* (2013.01); *H04N 21/234* (2013.01); *H04N 21/235* (2013.01)

(58) Field of Classification Search
    CPC .................. H04N 21/26258; H04N 21/26283; H04N 21/26616; H04N 21/6405; H04N 21/8456; G06F 17/30017
    USPC .............................................. 725/95, 97, 116
    See application file for complete search history.

(56) References Cited

U.S. PATENT DOCUMENTS

| | | | | |
|---|---|---|---|---|
| 8,874,779 B2* | 10/2014 | Ma | .............. | H04N 21/44209 709/200 |
| 8,910,229 B2* | 12/2014 | Xu | .............. | H04N 21/8456 725/116 |
| 2005/0190781 A1* | 9/2005 | Green | .............. | H04L 29/06027 370/432 |
| 2009/0201929 A1* | 8/2009 | Patel | .............. | H04L 12/1881 370/390 |
| 2009/0248886 A1* | 10/2009 | Tan | .............. | H04L 12/1836 709/231 |
| 2010/0254462 A1* | 10/2010 | Friedrich | .............. | H04N 21/26616 375/240.25 |
| 2011/0188439 A1* | 8/2011 | Mao | .............. | H04N 7/17318 370/312 |
| 2011/0209025 A1* | 8/2011 | Takahashi | .............. | H03M 13/356 714/752 |
| 2011/0219098 A1* | 9/2011 | Xu | .............. | H04N 21/85406 709/219 |

(Continued)

*Primary Examiner* — An Son P Huynh

(57) ABSTRACT

A method, a device, and a non-transitory storage medium provide for receiving program data of programs; receiving files pertaining to each of the programs, wherein the files include a manifest file and M3U8 files; selecting one of the programs and the manifest file; adding multicast information to each M3U8 file pertaining to the program, wherein the multicast information indicates a multicast channel and a date and a time of a multicast; segmenting the program data of the program based on a maximum transmission unit of the multicast channel; storing the manifest file and the M3U8 files pertaining to the program; providing the manifest file and one or more of the M3U8 files pertaining to the program, to a user device; and multicasting a segmented program data via the wireless network based on the multicast information, wherein the multicasting includes the adaptive bitrate streaming service.

20 Claims, 15 Drawing Sheets

(56) References Cited

U.S. PATENT DOCUMENTS

| | | | |
|---|---|---|---|
| 2011/0280241 A1* | 11/2011 | Field | H04L 12/185 370/390 |
| 2012/0047542 A1* | 2/2012 | Lewis | H04N 21/44016 725/97 |
| 2012/0124179 A1* | 5/2012 | Cappio | H04L 65/104 709/219 |
| 2012/0144445 A1* | 6/2012 | Bonta | H04L 12/1868 725/116 |
| 2012/0246462 A1* | 9/2012 | Moroney | H04L 63/10 713/151 |
| 2012/0259994 A1* | 10/2012 | Gillies | H04L 12/1881 709/231 |
| 2012/0265892 A1* | 10/2012 | Ma | H04N 21/23418 709/231 |
| 2013/0067052 A1* | 3/2013 | Reynolds | H04L 67/02 709/223 |
| 2013/0091249 A1* | 4/2013 | McHugh | H04N 21/23439 709/219 |
| 2013/0091521 A1* | 4/2013 | Phillips | H04N 21/23424 725/35 |
| 2013/0097309 A1* | 4/2013 | Ma | H04L 29/08099 709/224 |
| 2013/0159388 A1* | 6/2013 | Forsman | H04N 21/64322 709/203 |
| 2013/0227283 A1* | 8/2013 | Williamson | H04L 9/0825 713/168 |
| 2013/0268630 A1* | 10/2013 | Besehanic | H04L 65/80 709/219 |
| 2013/0291002 A1* | 10/2013 | Rothschild | H04N 21/258 725/25 |
| 2014/0068690 A1* | 3/2014 | Luthra | H04N 21/234309 725/110 |
| 2014/0129618 A1* | 5/2014 | Panje | H04N 21/26258 709/203 |
| 2014/0189046 A1* | 7/2014 | Vezzuto | H04L 67/108 709/217 |
| 2014/0208374 A1* | 7/2014 | Delaunay | H04L 65/60 725/109 |
| 2014/0280781 A1* | 9/2014 | Gregotski | H04L 65/60 709/219 |
| 2014/0282262 A1* | 9/2014 | Gregotski | H04N 21/2387 715/838 |
| 2014/0282777 A1* | 9/2014 | Gonder | H04L 65/605 725/109 |
| 2014/0380376 A1* | 12/2014 | Schmidt | H04L 65/4084 725/54 |
| 2015/0007239 A1* | 1/2015 | Cranman | H04N 21/2402 725/95 |
| 2015/0067722 A1* | 3/2015 | Bjordammen | H04N 21/23424 725/32 |
| 2015/0106505 A1* | 4/2015 | Ramaswamy | G06Q 30/02 709/224 |
| 2015/0113100 A1* | 4/2015 | Tweedale | H04L 41/08 709/219 |
| 2015/0172340 A1* | 6/2015 | Lohmar | H04N 21/2401 709/219 |
| 2015/0207838 A1* | 7/2015 | Gabin | H04L 65/4084 709/219 |
| 2015/0271234 A1* | 9/2015 | O'Malley | H04L 65/602 709/219 |
| 2015/0288732 A1* | 10/2015 | Phillips | H04L 65/60 709/219 |
| 2015/0381680 A1* | 12/2015 | Thornburgh | H04L 67/02 709/231 |
| 2016/0011923 A1* | 1/2016 | Walker | G06F 11/0751 714/49 |
| 2016/0072637 A1* | 3/2016 | Gholmieh | H04L 65/4076 709/219 |

* cited by examiner

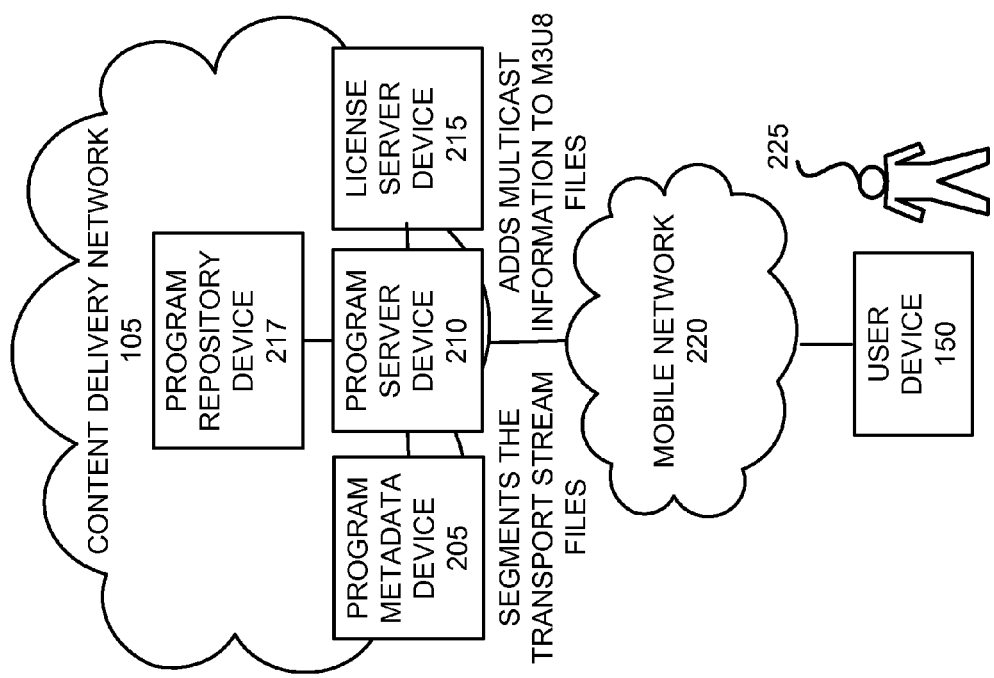

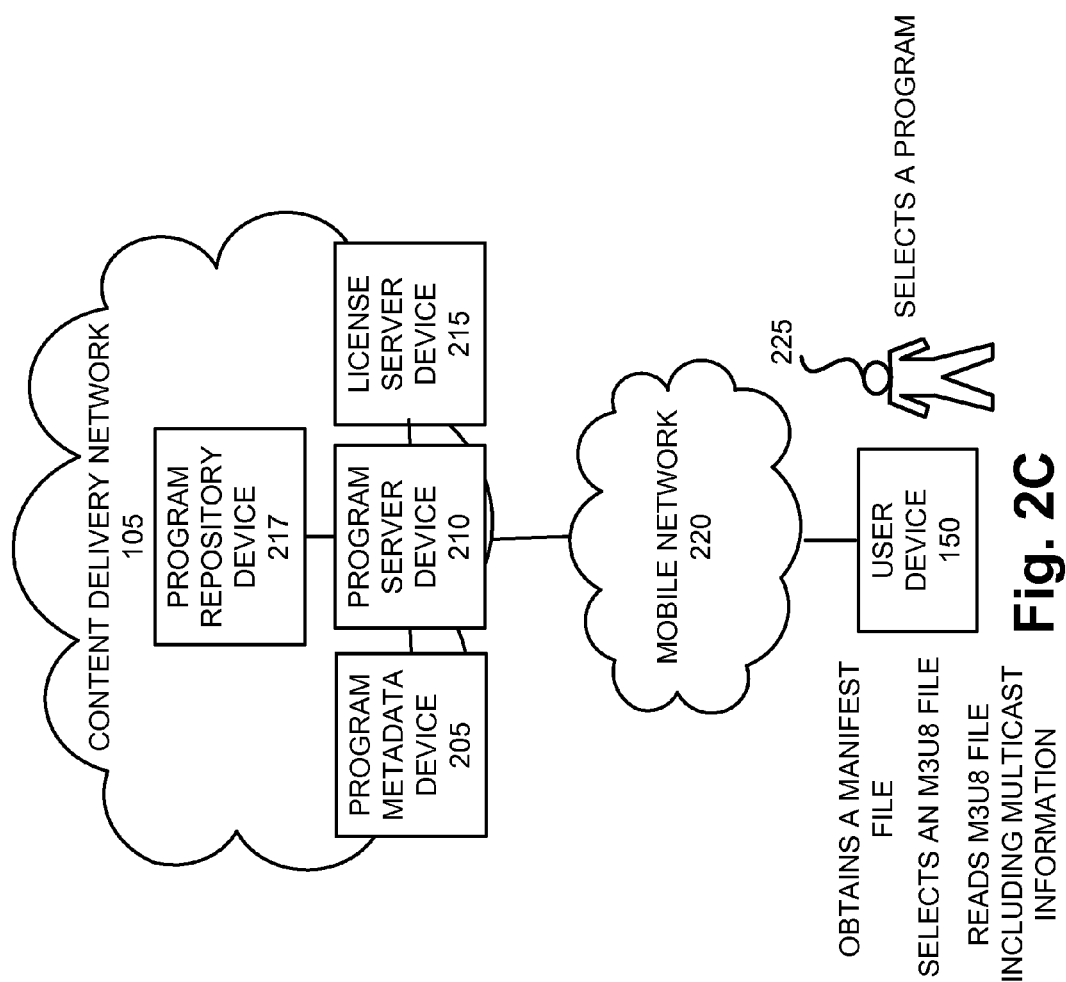

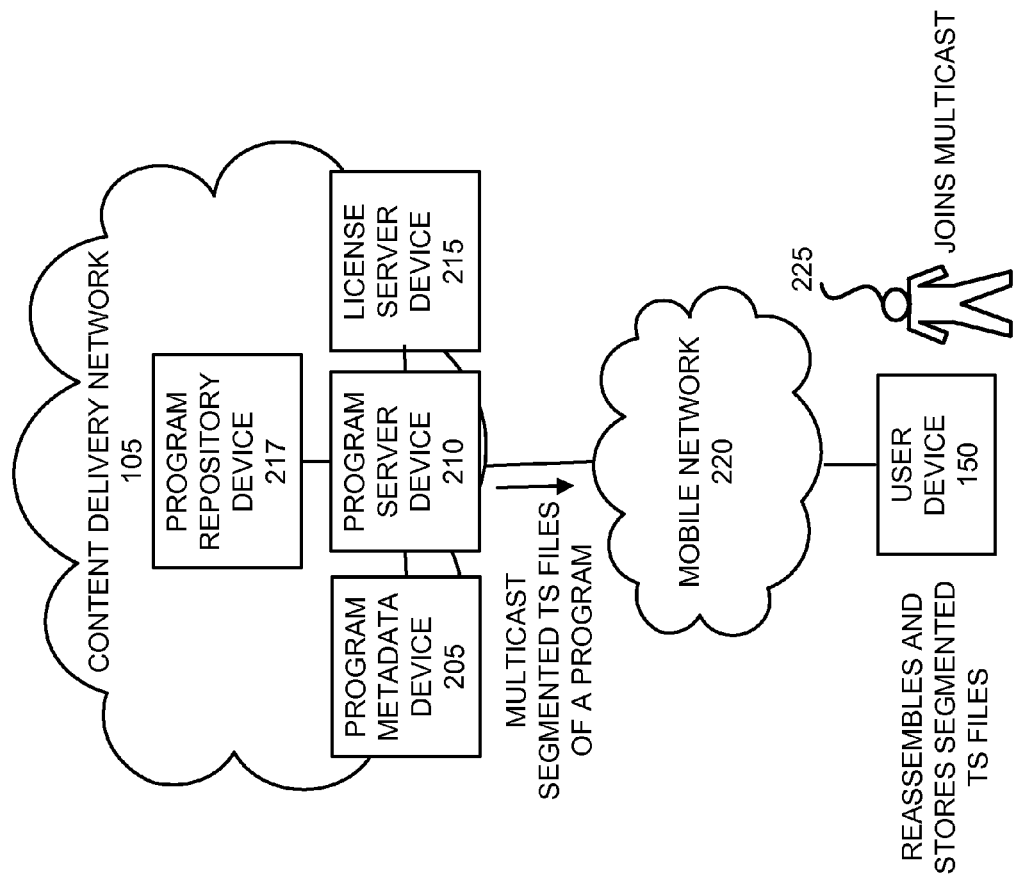

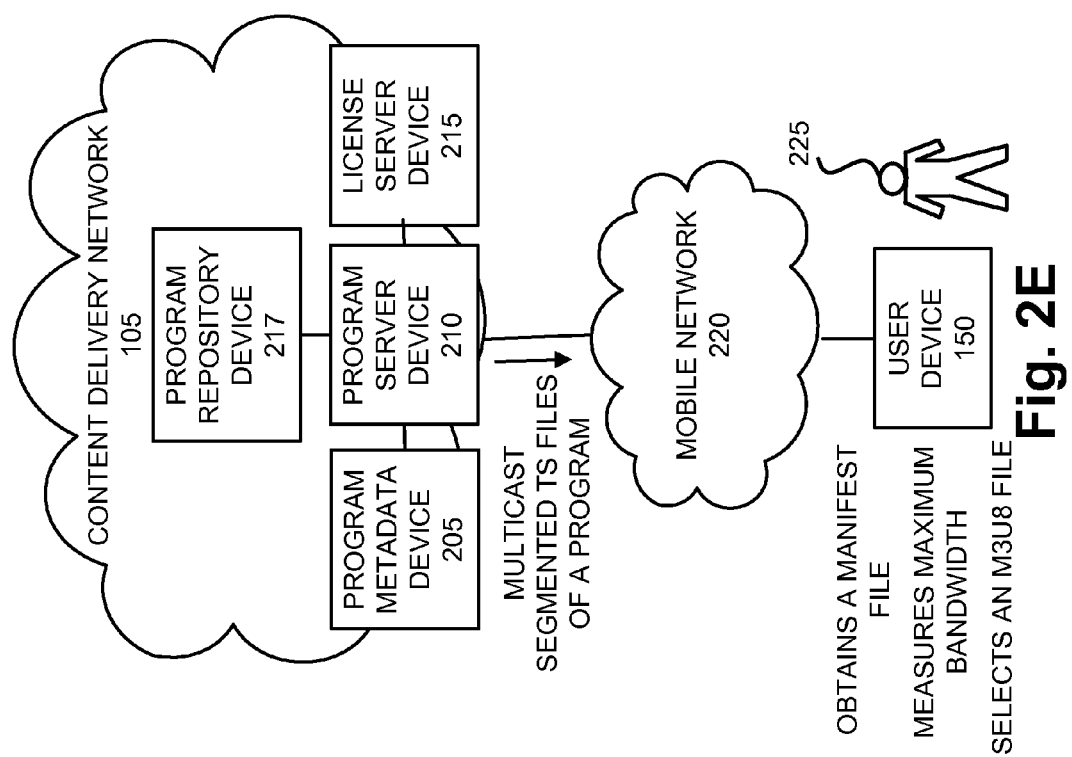

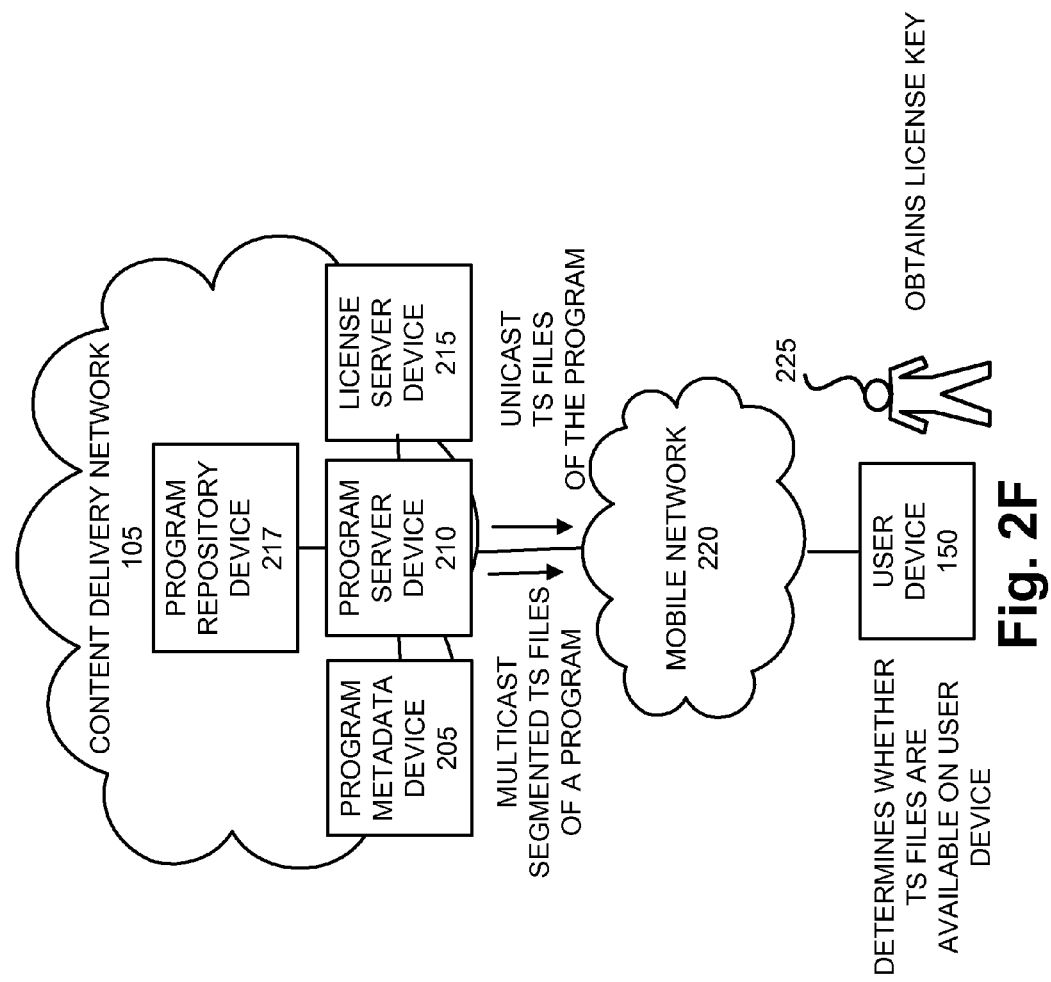

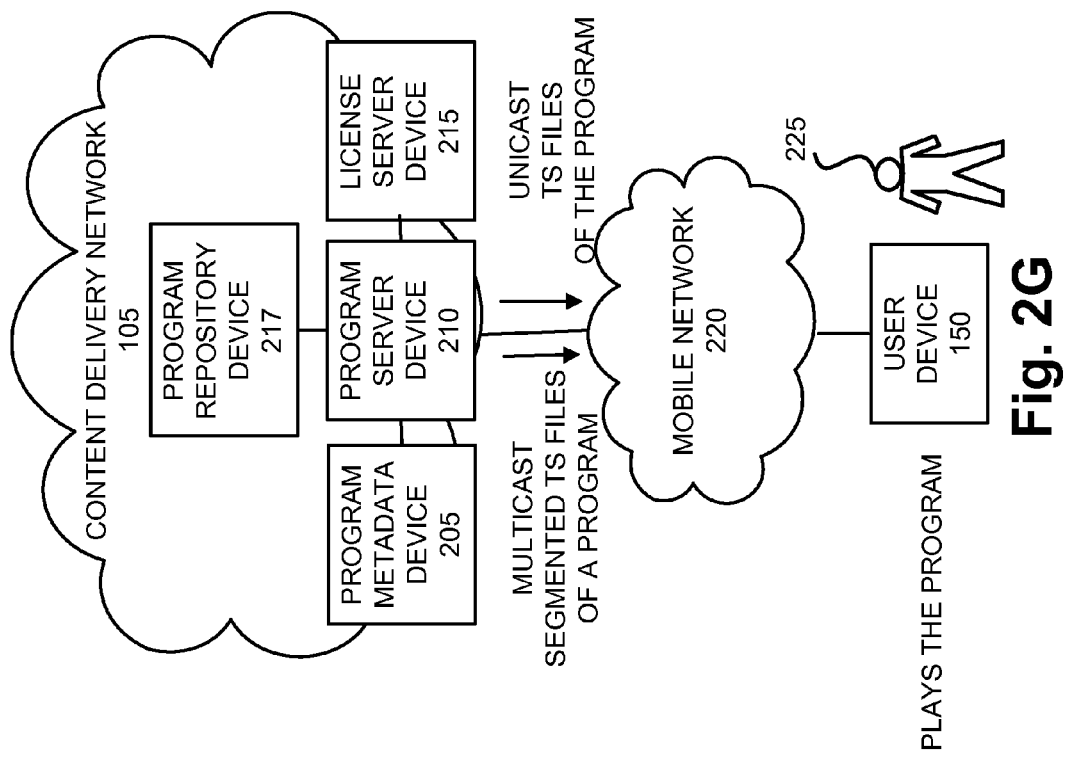

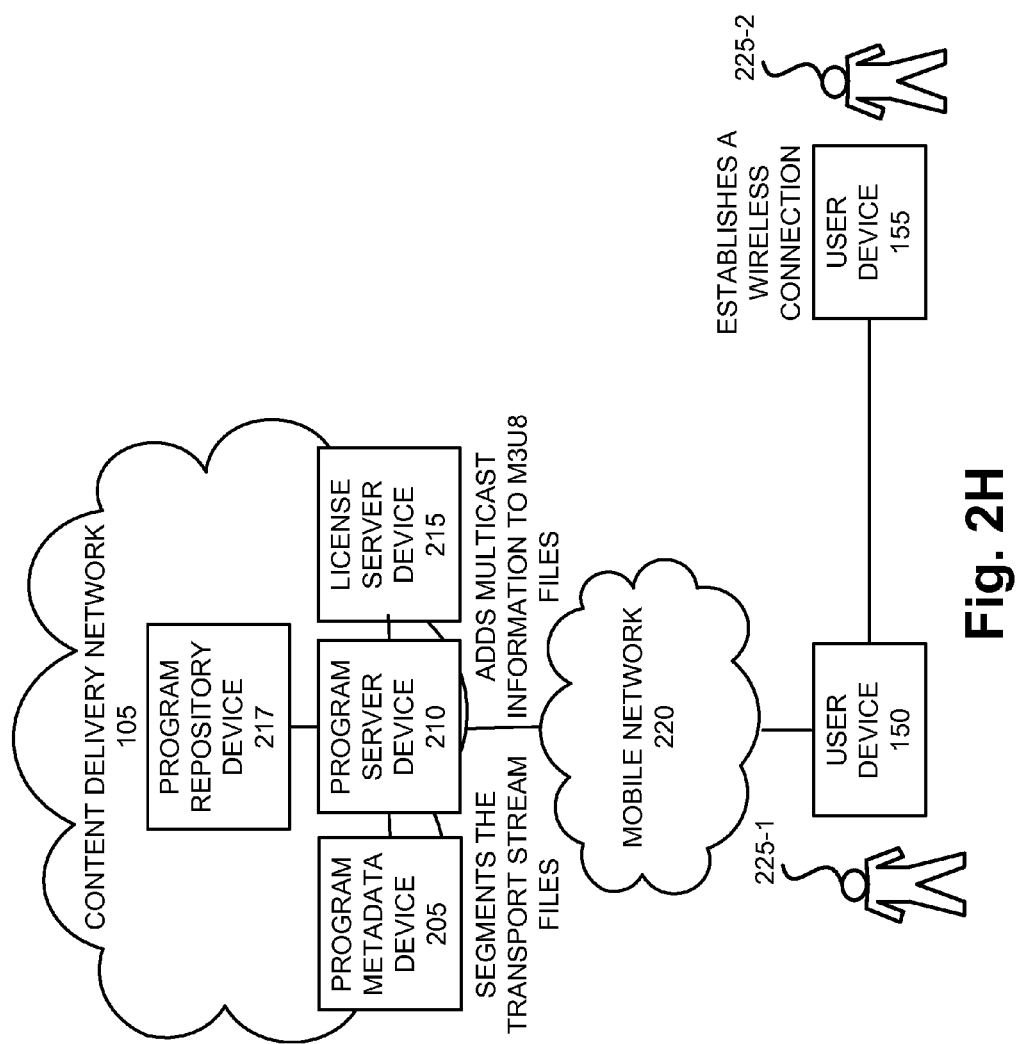

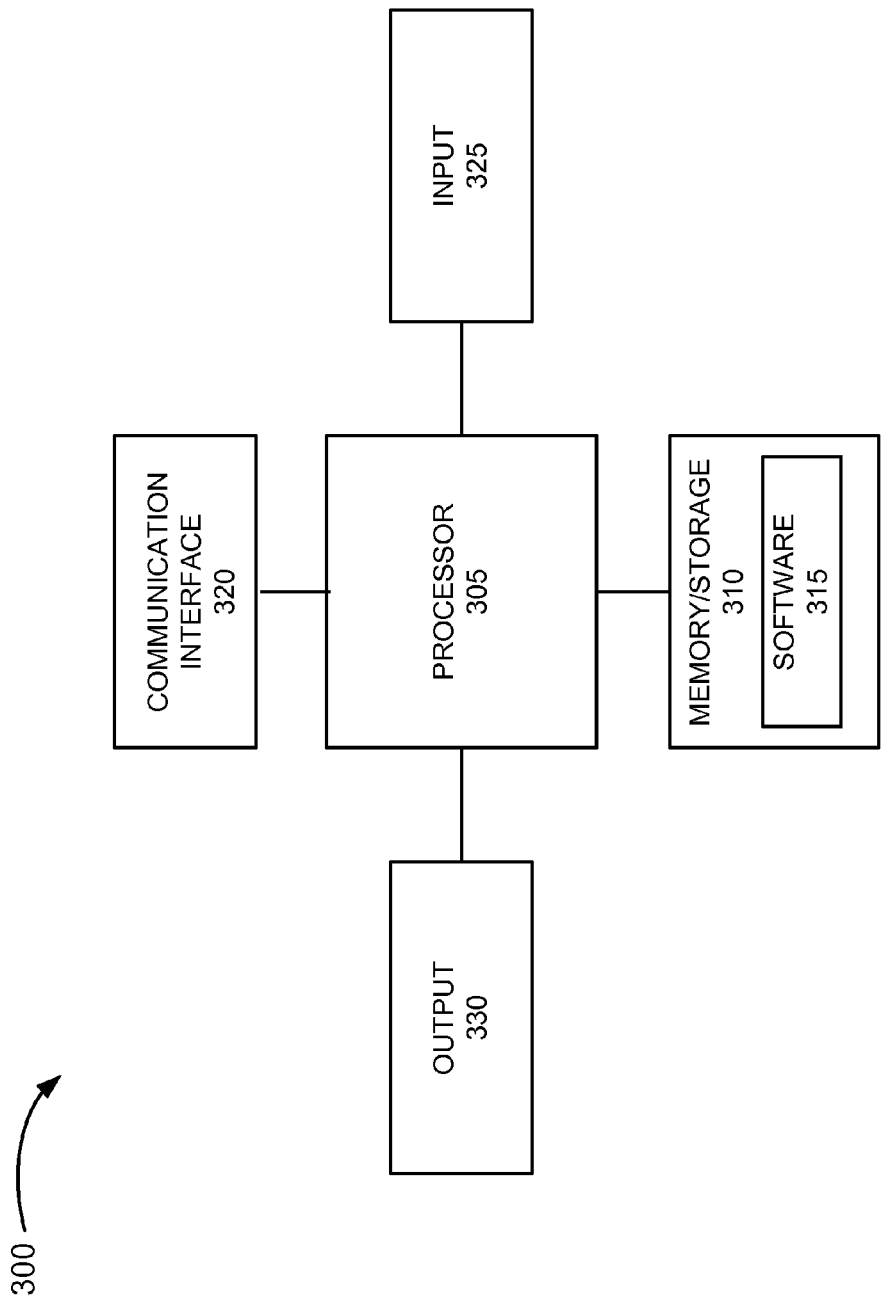

MULTICAST AND UNICAST ADAPTIVE BITRATE SERVICES

BACKGROUND

A content delivery network (CDN) (also known as a content distribution network) is used for delivering programs to users via user devices. The content delivery network stores and delivers the programs to users either on-demand, according to a program schedule, or both.

BRIEF DESCRIPTION OF THE DRAWINGS

FIGS. 2A-2G are diagrams that illustrate an exemplary scenario pertaining to an exemplary embodiment of the multicast and unicast adaptive bitrate service;

FIG. 2H is a diagram illustrating another exemplary scenario pertaining to an exemplary embodiment of the multicast and unicast adaptive bitrate service;

FIG. 3 is a diagram illustrating exemplary components of a device that may correspond to one or more of the devices in an exemplary environment;

DETAILED DESCRIPTION OF PREFERRED EMBODIMENTS

Figure 1:
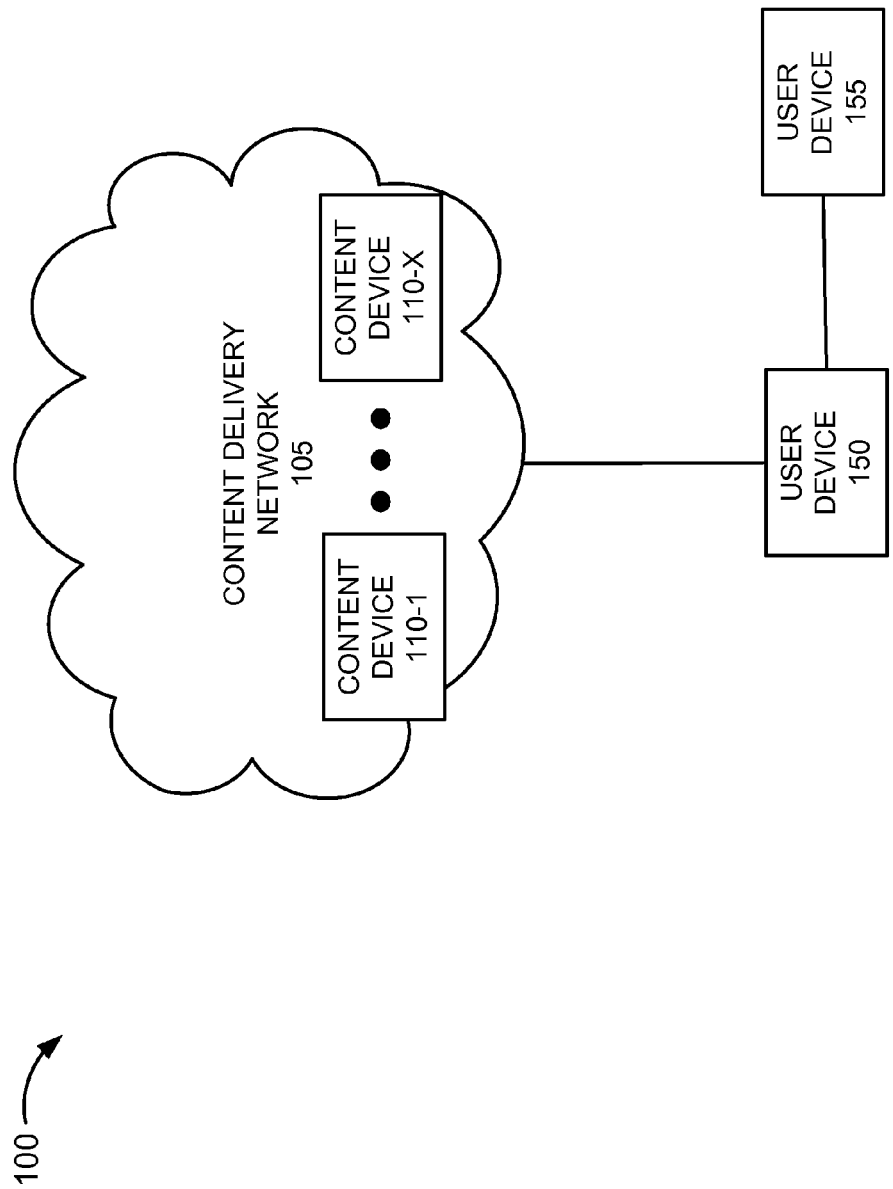
FIG. 1 is a diagram illustrating an exemplary environment in which an exemplary embodiment of multicast and unicast adaptive bitrate services may be implemented.

The following detailed description refers to the accompanying drawings. The same reference numbers in different drawings may identify the same or similar elements. Also, the following detailed description does not limit the invention.

As used herein, the term "program" refers to audio content and/or visual content. For example, a program may include a linear television program (e.g., a movie, a program of a television series, a reality show, a documentary, etc.), an on-demand program, a pay-per-view program, music, a pre-recorded program, a live program, or user-generated content. A program may be free or may require some form of purchase (e.g., buy, rent, etc.).

A program service provider (e.g., a multiple system operator (MSO)) may offer a program service for programs. The program service may be a subscription-based program service that delivers programs to users. The program service delivers programs to users via a content delivery network. Users may be able to receive programs via streaming and/or downloading. Depending on the program service provider, the content delivery network may have a national geographic presence, a regional geographic presence, or a local geographic presence. By way of further example, in a national-based context, the content delivery network may include a centralized center or distributed centers that receive programs and metadata from program providers, process the programs and metadata (e.g., transcode, format, encrypt, etc.), manage digital rights (e.g., licensing, etc.), and distribute the programs and metadata to regional centers. The regional centers make the programs and metadata available to users via local nodes, as well as perform other functions (e.g., user entitlement management, billing, program recommendations, etc.).

Under an existing approach, when a user of a mobile device wishes to receive a program (e.g., a movie) via adaptive streaming (e.g., Hypertext Transfer Protocol (HTTP)-based adaptive streaming), a program player will obtain a file (e.g., a manifest file) from a network device of a content delivery network. The file includes a list of available bitrates for the program that a network device of the content delivery network supports for different bandwidths and different playback qualities. The program player of the mobile device measures the maximum bandwidth of a connection with a mobile network to which the mobile device is attached. The program player selects and obtains the appropriate index file from the network device based on the measured maximum bandwidth. The index file (e.g., an M3U8 playlist) includes a list of video files or segments (e.g., transport stream (ts) files) of the program for a particular bitrate. The index file may also include a network address (e.g., a Uniform Resource Locator (URL)) to obtain a license key. The program player may obtain the license key and obtains the transport stream (ts) files, one by one in sequence via a unicast delivery (e.g., a Hypertext Transfer Protocol (HTTP) unicast) from a network device of the content delivery network. The program player saves the transport stream files into a buffer of the mobile device. The program player uses video library functions on the mobile device to perform playback of the program from the buffer while using the license key for decryption.

While the existing approach for delivery and playback of the program to a mobile device may provide a reasonable quality-of-service, when bandwidth is in high demand, such as wireless bandwidth within a mobile network, using unicast delivery to provide the transport stream files to the mobile device may not be efficient. As a comparative, one streaming server may serve, via multicasting, 300 channels and 10 million users using 1.5 Gigabits per second (Gbps) of network capacity, whereas 10,000 streaming servers may be needed to serve, via unicasting, 300 channels using 50 Terabits per second (Tbps) of network capacity.

According to an exemplary embodiment, a network device obtains a file that indicates a list of possible bitrates available for a program and names of metadata files pertaining to transport stream files of the program. According to an exemplary implementation, the file is a manifest file. For example, the manifest file indicates a list of bitrates and corresponding names of M3U8 files. According to an exemplary embodiment, the network device obtains, for each bitrate, a corresponding metadata file. For example, according to an exemplary implementation, the network device obtains the M3U8 file for each bitrate.

According to an exemplary embodiment, the network device adds metadata to the metadata file (e.g., the M3U8 file). According to an exemplary embodiment, the added metadata indicates a multicast channel, and a date and time of a multicast delivery, from which a user device (e.g., a mobile device) may obtain the corresponding transport stream files of a particular bitrate of the program. For example, according to an exemplary implementation, the network device adds text to the M3U8 file that indicates a multicast channel of the mobile network, such as a Long Term Evolution (LTE) multicast channel (e.g., a Multimedia Broadcast Multicast Service (MBMS) channel) and a date and time the multicast of the transport stream files will occur.

According to an exemplary embodiment, the network device obtains the transport stream files and, if needed, segments each transport stream file to a size of the maximum transmission unit (MTU) supported by the multicast channel.

According to an exemplary embodiment, the network device is a part of the content delivery network and multicasts the transport stream files. For example, the network device may be implemented as a program server device that services user requests for programs. According to another exemplary embodiment, another network device may multicast the segmented transport stream files.

According to an exemplary embodiment, a user device includes a program server. According to an exemplary embodiment, the user device is a mobile device and the program server includes an HTTP program server. As described further below, according to an exemplary embodiment, the program server streams transport stream files of a program to a program player. For example, the program server uses the HTTP unicast protocol to stream the transport stream files to the program player of the user device. According to another exemplary embodiment, the program player may perform a local fetch from a memory or a storage device where the transport streams are stored, without the program server streaming the transport stream files of the program to the program player. Depending on where the program sever stores the transport stream files, the local fetch may include that the program player loads the transport stream files into a buffer used by the program player or the transport stream files may already be stored in the buffer. According to an exemplary embodiment, the program player resides on the user device. According to another exemplary embodiment, the program player resides on another user device. According to yet another exemplary embodiment, there may be multiple program players. For example, one program player may reside on the user device and one or multiple program players may reside on one or multiple other user devices. In this way, the program server of the user device may provide a program sharing service that allows the program server to stream a program to other program players of other user devices.

According to an exemplary embodiment, the program server obtains a file that indicates a list of possible bitrates available for a program and names of metadata files pertaining to transport stream files of the program. According to an exemplary implementation, the file is the manifest file. According to an exemplary embodiment, the program server obtains the appropriate index file from the network device of the content delivery network. The index file (e.g., an M3U8 playlist) includes a list of video files or segments (e.g., transport stream files) of the program for a particular bitrate and the multicast information (e.g., information indicating the multicast channel and a date and time the multicast of the transport stream files will occur). The index file may also include a network address (e.g., a Uniform Resource Locator (URL)) to obtain a license key.

According to an exemplary embodiment, the program server obtains the index file for each bitrate. According to another exemplary embodiment, the program server obtains the index file for fewer than all of the available bitrates. For example, the program server measures a maximum bandwidth of a connection between the user device and the network device of the content delivery network and/or a maximum bandwidth of a connection between the user device and another user device.

According to an exemplary embodiment, the program server tunes, via a receiver, to the multicast channel of a wireless network, based on the multicast information, and obtains the segmented transport stream files pertaining to the appropriate bitrate. According to an exemplary embodiment, the program server reassembles the MTUs of each segmented transport stream file to form the transport stream files belonging to the bitrate. The program server stores the assembled transport stream files on the user device. According to an exemplary embodiment, the program server streams the assembled transport stream files, using a unicast protocol (e.g., the HTTP unicast protocol), to a program player.

According to an exemplary embodiment, a user device includes a program player. According to an exemplary embodiment, the program player measures the maximum bandwidth of a connection with a wireless network to which the user device is attached. The program player selects and obtains the appropriate index file from the network device of the content delivery network based on the measured bandwidth. The index file (e.g., an M3U8 playlist) includes a list of video files or segments (e.g., transport stream files) of the program for a particular bitrate and the multicast information. The index file may also include a network address (e.g., a URL) to obtain a license key. The program player may obtain the license key from the content delivery network.

According to an exemplary embodiment, the program player determines whether the program server has the transport stream files of the program for the particular bitrate. When a transport stream file is available from the program server, the program player obtains the transport stream file from the program server. For example, as previously described, the program server streams (e.g., using the HTTP unicast protocol) the transport stream files of the program to the program player. Alternatively, the program player determines whether the transport stream files are stored (e.g., in the buffer or other storage area, as stored by the program server). When a transport stream file is not available from the program server, the program player obtains the transport stream file from the network device of the content delivery network. Also, when a transport stream file is available, but the transport stream file has uncorrectable errors, the program player obtains the transport stream file from the network device of the content delivery network. The program player saves the transport stream files into a buffer of the user device. The program player uses video library functions on the user device to perform playback of the program from the buffer while using the license key for decryption.

FIG. 1 is a diagram illustrating an exemplary environment in which an exemplary embodiment of multicast and unicast adaptive bitrate services may be implemented. As illustrated, environment 100 includes a content delivery network 105, which includes content devices 110-1 through 110-X (also referred to collectively as content devices 110 and individually or generally as content device 110). As further illustrated, environment 100 includes a user device 150 and a user device 155.

Environment 100 may be implemented to include wired, optical, and/or wireless connections among the devices and the network illustrated. A connection may be direct or indirect and may involve an intermediary device and/or an intermediary network not illustrated in FIG. 1. Additionally, the number, type (e.g., wired and wireless), and the arrangement of connections between the devices and the networks are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. For example, a single device in FIG. 1 may be implemented as multiple devices. By way of further example, user device 150 may include multiple devices, such as a display and a computer.

Additionally, or alternatively, environment 100 may include additional networks and/or differently arranged networks, than those illustrated in FIG. 1. For example, environment 100 may include an intermediary network. The types of devices and the types of networks in environment 100 are also exemplary. Also, according to other embodiments, one or more functions and/or processes described as being performed by a particular device may be performed by a different device, or some combination of devices.

Content delivery network 105 includes a network that provides access to and use of a program service. Generally, content delivery network 105 may be implemented as a satellite-based network, a terrestrial-based network, or a combination thereof. Content delivery network 105 may be implemented to distribute programs using various technologies, such as an optical architecture, a coaxial cable architecture, an Internet Protocol (IP) TV architecture, a digital subscriber line (DSL) architecture, a wireless architecture, and/or an Internet-based architecture. Depending on the architecture implemented, content delivery network 105 may include various types of network devices that contribute to the provisioning and distribution of the program service.

Content devices 110 include network devices that provide the program service. According to an exemplary embodiment, content devices 110 include network devices that provide various program services, such as a program processing device (e.g., transcoding, encryption, etc.), a digital rights management device, a licensing device, a login device (e.g., authentication, authorization, etc.), a program storage device, a metadata storage device, and a program server device. Content devices 110 may include other types of network devices, such as a billing device, a program recommendation device, a user account management device, etc. For purposes of description, content device 110-1 includes a program server device, as described herein. For example, content device 110-1 obtains the manifest file, obtains the M3U8 file for each bitrate, modifies the M3U8 file by adding multicast information, obtains the transport stream files, segments the transport stream files based on the MTU of the multicast channel, and multicasts the segmented transport stream files.

User device 150 includes a device that provides the multicast and unicast adaptive bitrate services. According to an exemplary embodiment, user device 150 is a mobile device. For example, user device 150 may be implemented as a smartphone, a tablet device, a computer (e.g., a laptop computer, a netbook, a palmtop computer, etc.), or some other type of end user device (e.g., an Internet access device, a user-worn device, etc.). According to another exemplary embodiment, user device 150 is a non-mobile device or a stationary device. For example, user device 150 may be implemented as a television and a set top box, a desktop computer, etc.

According to an exemplary embodiment, user device 150 includes the program server, as described herein. For example, the program server obtains the manifest file, obtains the M3U8 file for each bitrate or some other number of bitrates, obtains the transport stream files based on the multicast information, reassembles the segmented chunks of a transport stream file into a transport stream file for each transport file of a bitrate, and unicasts the transport stream files of the program of a particular bitrate to a program player.

According to an exemplary embodiment, user device 150 includes the program player, as described herein. For example, the program player obtains the manifest file, obtains the M3U8 file for a particular bitrate based on a maximum bandwidth measurement, determines whether the program server of user device 150 has any of the transport stream files, obtains a transport stream file from the program server of user device 150 when the program server has the transport stream file, obtains a transport stream file from the program server of content device 110 when the program server of user device 150 does not have the transport stream file or the transport stream file has an error that is uncorrectable. The program player also plays the transport stream files.

User device 155 includes a device that can play a program. For example, user device 155 may be implemented as a mobile device. User device 155 includes the program player. According to other exemplary environments, user device 155 may not exist or there may be multiple user devices 155.

Figure 2A:
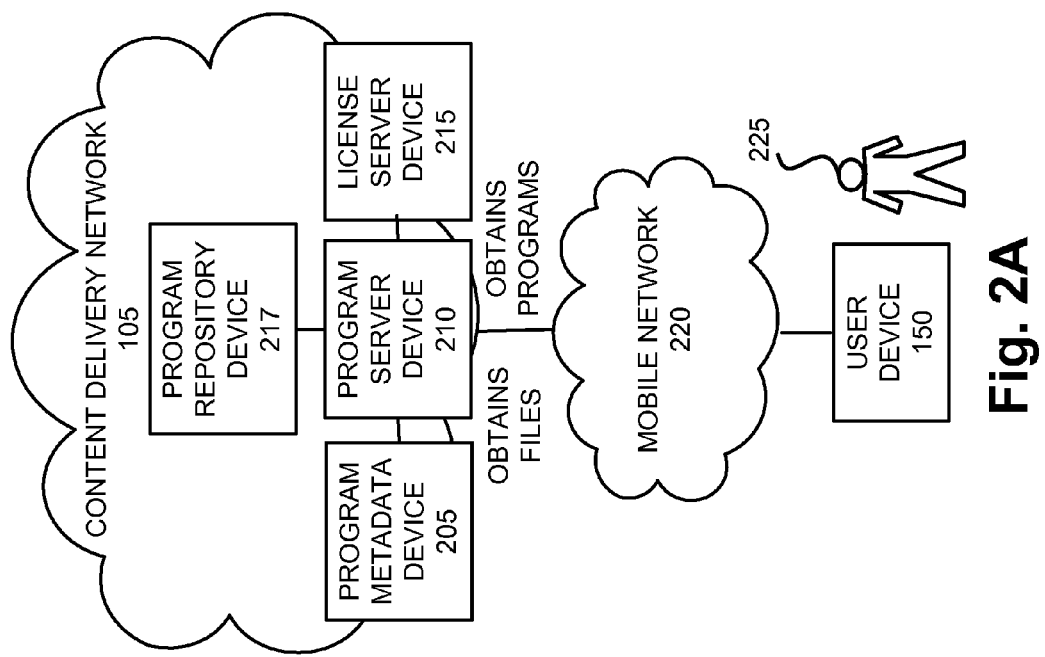

FIGS. 2A-2G are diagrams illustrating an exemplary scenario pertaining to an exemplary embodiment of the multicast and unicast adaptive bitrate service. As illustrated in FIG. 2A, content delivery network 105 includes a program metadata device 205, a program server device 210, and a license server device 215. Program metadata device 205, program server device 210, and license server device 215 are network elements of content devices 110, as previously illustrated and described in relation to FIG. 1.

Program metadata device 205 provides a storefront for users to select programs for viewing and/or listening. For example, program metadata device 205 stores metadata pertaining to the programs, such as title, genre, length of time of a program, format (e.g., high definition, 3D, etc.), program summary, cast and crew information, name of band, posters, etc. Program server device 210 provides multicast and unicast adaptive streaming services, as described herein. License server device 215 stores license keys for decrypting a program for user viewing and/or listening. Program repository device 217 stores programs and various files (e.g., manifest files, M3U8 files, etc.).

Mobile network 220 is a wireless network that provides access to content delivery network 105. For example, mobile network 220 may be implemented as an LTE network, a Code Division Multiple Access (CDMA) network, a Universal Mobile Telecommunications System (UMTS) network, a Global System for Mobile Communications (GSM) network, a Wideband Code Division Multiple Access (WCDMA) network, a High-Speed Packet Access (HSPA) network, an Evolution Data Optimized (EV-DO) network, and/or another type of wireless network (e.g., an LTE Advanced network, or future generation wireless network architecture). According to other implementations, other types of wireless networks may be used, such as a WiFi network, etc., as well as other types of networks, such as the Web, the Internet, etc., to access content delivery network 105. According to other embodiments, however, an exemplary environment may not include a mobile network (e.g., mobile network 220), a wireless network, and/or a user device (e.g., user device 150) that is a mobile device.

Referring to FIG. 2A, assume program server device 210 obtains programs (e.g., program data) from program repository device 217. For example, an edge server controller or a program management system (not illustrated) may manage the caching of programs on program server device 210 based on well-known methods, proprietary methods, algorithms (e.g., a Least Recently Used (LRU) algorithm, a Least Frequently Used (LFU) algorithm, etc.), statistical information, etc. Alternatively, program server device 210 may manage its own caching of programs based on various methods (e.g., collaborative caching, etc.). Additionally, program server device 210 obtains files pertaining to the programs. For example, program server device 210 obtains a manifest file and M3U8 files associated with each bitrate for the program from program repository device 217. Program server device 210 stores the programs and the files.

Referring to FIG. 2B, program server device 210 adds multicast information to each M3U8 file. Provided below is a portion of an exemplary, modified M3U8 file:

EXTM3U
EXT-X-VERSION:2
EXT-X-TARGET DURATION: 10
EXT-X-KEY: METHOD=AES-128, URI=http://localhost:999/histkey?psw=AS0tbGM (location of license key)
EXTINF:9,
KOVU1376-00-0.TS (list of transport stream files)
EXTINF:8,
KOVU1376-00-1.TS
EXTINF:10,
KOVU1376-00-2.TS
.
.
.
EXTINF:8,
KOVU1376-00-100.TS
EXTINF: MULTICAST (multicast information)
CHANNEL: 12
DATE/TIME: Oct. 30, 2014, 2:15 P.M.

As illustrated above, the M3U8 file includes a location of a license key and a list of transport stream files of a particular bitrate for a program. Program server device 210 adds the multicast information, such as a multicast channel (e.g., an Internet Protocol address, a port number, a channel number, etc.) and a date and time of a multicast of the program. According to an exemplary embodiment, program server device 210 may not add multicast information to an M3U8 file until at least one user request or a minimum number of user requests for the program of the particular bitrate are received. In this way, program server device 210 may schedule the date and the time of the multicast in accordance with user demand of the program. According to another exemplary embodiment, program server device 210 may add multicast information to an M3U8 file without necessarily receiving a user request for the program. For example, program server device 210 may multicast the program based on a schedule provided by the program service provider. By way of further example, program server device 210 may use information similar to an electronic programming guide (EPG) to schedule the date, the time, and the multicast channel for multicasting a program.

Referring to FIG. 2B, program server device 210 segments each transport stream file into smaller chunks based on the MTU size of the multicast channel. For example, program server device 210 may segment each transport stream file based on the multicast channel of mobile network 220. Depending on the type of wireless network, the MTU size may be different. Thus, program server device 210 may segment each transport stream file based on multiple sizes of MTUs, which may correspond to different mobile networks (e.g., CDMA, LTE, etc.). For example, program server device 210 stores MTU information that indicates the MTU sizes of multicast channels for multiple types of wireless networks. Program server device 210 uses the stored MTU information when segmenting each transport stream file. In this way, program server device 210 may store an array of segmented transport stream files for a variety of MTUs. Program server device 210 stores the segmented transport stream files and the modified M3U8 files.

Referring to FIG. 2C, assume a user 225 of user device 150 connects to program metadata device 205 so as to select a program for an adaptive streaming session. Program metadata device 205 provides a user interface that allows user 225 to select a program of his or her choice. Assume, user 225 selects a program and user device 150 is redirected to program server device 210. The program server of user device 150 obtains a manifest file belonging to the selected program from program server device 210. Provided below is a portion of an exemplary manifest file:

EXTM3U
EXT-X-STREAM-INF:BANDWIDTH=256000 (Bitrate of M3U8 file)
KOVU1377622.001.m3u8 (M3U8 file)
EXT-X-STREAM-INF:BANDWIDTH=160000 (Bitrate of M3U8 file)
KOVU1377622.006.m3u8 (M3U8 file)
.
.
.
EXT-X-STREAM-INF:BANDWIDTH=864000 (Bitrate of M3U8 file)
KOVU1377622.0016.m3u8 (M3U8 file)

According to an exemplary embodiment, the program server of user device 150 can select one or multiple bitrates corresponding to one or multiple M3U8 files. For example, according to an exemplary embodiment, the program player may communicate with the program server to inform the program server of the M3U8 file to select. For example, as described further below in relation to FIG. 2E, the program player may select the M3U8 file based on a measured maximum bandwidth pertaining to a connection with mobile network 220.

Alternatively, according to another exemplary embodiment, the program server of user device 150 may select one or multiple M3U8 files. The program server of user device 150 may select the particular M3U8 file based on the communication with the program player, historical bitrate information based on past usage of mobile network 220 or a combination of all wireless networks used, location of user device 150, and/or other criteria or policies (e.g., obtain a high bitrate and a low bitrate, etc.).

Referring to FIG. 2C, the program server of user device 150 reads the multicast information from one or multiple M3U8 files, which have been selected, to determine when a multicast is to take place. Program server device 210 may multicast segmented transport stream files belonging to a particular bitrate of the program on a single multicast channel. Alternatively, program server device 210 may multicast segmented transport stream files belonging to different bitrates of the program on a single multicast channel. By way of further example, the multicast channel may carry, in a time-slotted, interleaving manner, the segmented transport stream files belonging to different bitrates. According to other implementations, different bitrates may be multicast through other conventional methods (e.g., frequency hopping, etc.). According to another example, the program server of user device 150 may obtain multiple M3U8 files by tuning to multiple multicast channels (e.g., either simultaneously or intermittently depending on the communication interface capabilities of user device 150).

Depending on the type of program, the multicast information may allow the program server of user device 150 to obtain the M3U8 file(s) with little delay. For example, assume that user 225 selected a program that is a live program or a program that is scheduled according to an EPG. If user 225 selects the program near its scheduled time, the program server may obtain the M3U8 file(s) with little delay since a multicast of the segmented transport stream files is likely to occur near its scheduled time (as would be indicated by the multicast information included in the M3U8 file). According to other examples, such as a video-on-demand program, a pay-per-view program, etc., the multicast information may indicate that the program server of user device 150 will have to wait some period of time before a next multicast is to take place. According to an exemplary embodiment, the program server of user device 150 determines whether the wait time period is beyond a threshold time period. For example, the program server calculates a wait time period (e.g., using the current time and the time of the multicast) and compares the wait time period to a threshold wait time period. When the wait time period is shorter than the threshold wait time period, the program server will join the future multicast. Otherwise, the program server may obtain the program from a unicast delivery from program server device 210. The program server may also prompt the user as to the wait time period, via a user interface, and obtain instructions (e.g., a user input via the user interface) from the user as to how to proceed.

Additionally, according to an exemplary embodiment, the program server of user device 150 may initially receive the transport stream files of the program from program server device 210 via a unicast delivery, and subsequently switch to (e.g., join) a multicast of the program. By way of example, this may occur when the user pauses or stops the program for a period of time, or rewinds or replays a portion of the program. For example, the program player of user device 150 may monitor trickplay input or user input during the playing of the program to determine whether a triggering event satisfies certain criteria (e.g., a pause or a series of pauses that last a threshold period of time, a stop or a series of stops that last a threshold period of time, a rewind to a particular portion of the program that is equivalent to a particular length of the program, time period, etc.). When the program player determines that the triggering event occurs, the program player informs the program server. The program server of user device 150 uses this information and the multicast information to calculate whether segmented transport stream files from the multicast could be used in continuance of the playing of the program or streaming session. For example, the program server of user device 150 may determine the current time window of playback of the program relative to the multicast and the current position of playback of the program in relation to the user. When the program server determines that the segmented transport stream files from the multicast could be used, the program server joins the multicast.

According to an exemplary embodiment, the program server of user device 150 pre-fetches a program based on program recommendation logic, an advertisement from program metadata device 205 indicating a new program available, input from user 225 that indicates to have a particular program stored on user device 150 by a particular date and/or time, etc. In this way, the program server of user device 150 may minimize the delay that user 225 may have to wait before the segmented transport stream files are obtained from a multicast, reassembled, and ready for playback. According to yet another exemplary embodiment, the program server or the program player of user device 150 may obtain transport stream files from program server device 210 based on a unicast delivery (e.g., an HTTP unicast) when the wait time for obtaining the segmented transport stream files from a multicast is beyond a particular time period threshold.

Referring to FIG. 2D, assume that the program server of user device 150 uses the multicast information to obtain segmented transport stream files belonging to one or multiple bitrates from a multicast provided by program server device 210. For example, user device 150 joins the multicast of the segmented transport stream files of the program based on conventional methods (e.g., tuning to a particular channel, connect to an IP address, port number, etc.). The program server of user device 150 receives the segmented transport stream files via mobile network 220, and reassembles the segmented transport stream files into transport stream files, as previously described. Additionally, the program server of user device 150 stores the transport stream files in a buffer (e.g., for immediate playback) or other memory/storage (e.g., in a pre-fetch case).

Referring to FIG. 2E, the program player of user device 150 may assist in the selection of the M3U8 file. For example, the program player of user device 150 may obtain the manifest file (e.g., from program sever device 210 or the program server of user device 150), measure the maximum bandwidth of a connection with mobile network 220, and select a bitrate from the manifest file and corresponding M3U8 file. The program player of user device 150 may indicate the selected bitrate and/or M3U8 file to the program server of user device 150. This process loops so that the program player of user device 150 obtains the appropriate transport stream files that best match the measured maximum bandwidth and corresponding bitrate during the course of the playing of the program. For example, the program player of user device 150 may periodically measure the maximum bandwidth and provide this information to the program player of user device 150 to provide for an adaptive bitrate streaming session of the program. The program server of user device 150 obtains, in turn, based on the updated maximum bandwidth, the segmented transport stream files corresponding to the appropriate bitrate from a particular multicast (e.g., based on the multicast information).

Referring to FIG. 2F, when the program player of user device 150 is invoked to playback the program, the program player determines whether the transport stream files of the program are available from the program server of user device 150. For example, the program player may communicate with the program server of user device 150 and requests the program. When the program server has stored at least a portion of the program (e.g., the program server of user device 150 is receiving the multicast) or has already stored all of the program, the program server of user device 150 transmits each transport stream file, one by one in sequence (e.g., an HTTP unicast), to the program player and saves each transport stream file in the buffer that the program player uses for playback. Alternatively, the program player may fetch each transport stream file from, for example, a local memory that stores the transport stream files. When the program server of user device 150 indicates that it does not have the program or any particular transport stream file (e.g., due to a problem or an error that occurred during the multicast, etc.), then the program player establishes a session (e.g., an HTTP unicast session) with program server device 210 to obtain the program or the particular transport stream file.

According to an exemplary embodiment, the program player provides an error correction service that uses conventional forward error correction to correct an error in a transport stream file. In the event that the transport stream file has an error that cannot be corrected, the program player establishes a session (e.g., an HTTP unicast session) with program server device 210 to obtain an error-free, transport stream file. Alternatively, the program server of user device 150 provides the error correction service.

As further illustrated in FIG. 2F, the program player of user device 150 obtains the license key from license server device 215 based on the URI indicated in the M3U8 file. For example, the program server may provide the URI to the program player or the program player may obtain the M3U8 file and read the URI from the file. Referring to FIG. 2G, the program player of user device 150 uses video library functions to perform playback of the program from the buffer while using the license key for decryption. During this time, the program server of user device 150 may be receiving segmented transport stream files of a program (e.g., when the program is a live program) from program server device 210 during playback of the program. Additionally, the program player of user device 150 may receive a unicast transport stream from program server device 210 during playback, as previously described.

Although FIGS. 2A-2G illustrate an exemplary scenario pertaining to the multicast and unicast adaptive bitrate service, according to other scenarios, other types of processes may be performed.

As previously described, the program server of user device 150 may provide a program sharing service that allows the program server to stream a program to other program players of other user devices 155. Referring to FIG. 2H, assume user 225-1 of user device 150 and a user 225-2 of user device 155 are traveling in a car. User 225-1 and user 225-2 both agree to watch a same movie. However, user device 155 is unable to connect to mobile device 220. For example, user device 155 may be a legacy device. User device 150 is able to connect mobile network 220 and has hotspot capabilities, which user device 155 is able to use. User device 155 establishes a wireless connection with user device 150 so that a streaming session with the program server of user device 150 can occur. In a manner similarly to that previously described, the program server of user device 150 obtains transport stream files belonging to one or multiple bitrates. Additionally, for example, the program player of user device 155 may measure the bandwidth of the connection between user device 155 and user device 150. The program player of user device 155 communicates this information to the program server of user device 150. The program server of user device 150 uses this information to select a particular bitrate and corresponding segmented transport stream files to receive, reassemble, etc. The program player of user device 155 receives the transport stream files from user device 150 and user 225-2 views the program. In the event that a transport stream file is not available or contains an error that is not correctable, the program server of user device 150 obtains the transport stream file from program server device 210.

Although FIG. 2H illustrates an exemplary scenario pertaining to the multicast and unicast adaptive bitrate service, according to other scenarios, other types of processes may be performed. For example, the program server of user device 150 may pre-fetch a program and have the program available for other user devices and users. Thus, according to another scenario, user device 155 may detect user device 150 as having the program server and program sharing service capabilities. User 225-2 may view the available programs stored on user device 150 via a user interface. User 225-2 may select one of the programs already stored on user device 150 for viewing on user device 155 via the program player of user device 155.

FIG. 3 is a diagram illustrating exemplary components of a device 300 that may correspond to one or more of the devices in the environments described herein. For example, device 300 may correspond to content device 110, user device 150, user device 155, as well as other devices illustrated and described. As illustrated in FIG. 3, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or computer programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 310 may include a hard disk (e.g., a magnetic disk, an optical disk, a magneto-optic disk, a solid state disk, etc.) and a corresponding drive. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a program that provides a function and/or a process. In this context, the term "program" is used in the sense of a sequence of instructions designed for execution on a computer system. A "program" or a "computer program" may include a subroutine, a function, a procedure, an object method, an object implementation, an applet, a servlet, a source code, an object code, a shared library/dynamic load library and/or other sequence of instructions designed for execution on a computer system. The term "program," when used to mean, for example, audio and/or video data versus used to mean a set of instructions will be apparent from the context of use in the present document. As an example, with reference to content device 110, software 315 may include an application that, when executed by processor 305, provides the functions of the multicast and unicast adaptive bitrate services, as described herein. Additionally, for example, with reference to user device 150, software 315 may include an application that, when executed by processor 305, provides the functions of the multicast and unicast adaptive bitrate services, as described herein. Software 315 may include firmware.

Communication interface 320 permits device 300 to communicate with other devices, networks, systems, and/or the like. Communication interface 320 includes one or multiple wireless interfaces and/or wired interfaces. For example, communication interface 320 may include one or multiple transmitters and receivers or transceivers. Communication interface 320 may operate according to a protocol stack and a communication standard.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 causes processor 305 to perform a process described herein. Alternatively, for example, according to other implementations, device 300 performs a process described herein based on the execution of hardware (processor 305, etc.).

Figure 4:
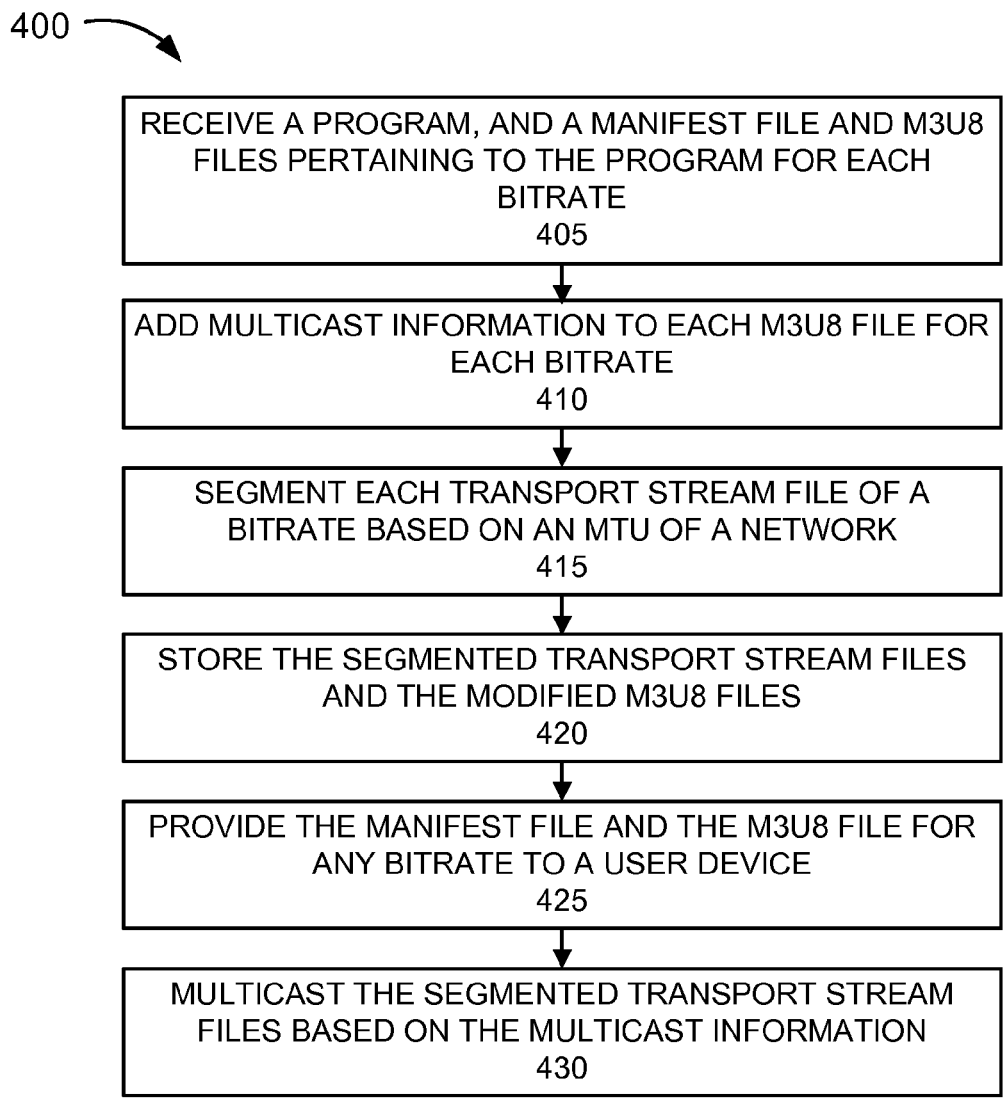
FIG. 4 is a flow diagram that illustrates an exemplary process pertaining to the multicast and unicast adaptive bitrate services.

FIG. 4 is a flow diagram illustrating an exemplary process 400 pertaining to the multicast and unicast adaptive bitrate services. Process 400 is directed to a process previously described above with respect to FIGS. 2A-2G and elsewhere in this description, in which content device 110 of content delivery network 105 uses multicast delivery for HTTP-based adaptive bitrate streaming sessions. As previously described, various types of programs, such as linear television programs, live programs, video-on-demand programs, pay-per-view programs, etc., may be multicasted to users based on an HTTP-based adaptive bitrate streaming delivery. This is in contract to conventional approaches in which programs (e.g., transport stream files) are unicasted to users using an adaptive bitrate delivery system. According to an exemplary embodiment, content device 110 performs one or more of the steps described in process 400. For example, processor 305 of program server device 210 executes software 315 to perform the steps described.

Referring to FIG. 4, block 405, process 400 begins in which a program, and a manifest file and M3U8 files pertaining to the program for each bitrate are received. For example, program server device 210 obtains the program (e.g., program data) and the files from program repository device 217. Program server device 210 may also receive other information, such as a program schedule. The program schedule provides date, day, and time information pertaining to when the program is to be provided or made available (e.g., multicasted, etc.) to users. For example, the program schedule may be an entry or a part of an EPG for a live program or a pre-recorded program. Alternatively, the program may be an on-demand program or a pay-per-view program. The program schedule may be geographic-specific (e.g., a certain locale of the United States, etc.). Additionally, the program schedule may be dynamic based on user demand. For example, a minimum number of requests (e.g., overall or within a particular geographic region) for an on-demand program or a pay-per-view program may be needed before a multicast is scheduled and provided. Additionally, for example, other factors, such as the popularity of the program may influence the program schedule and the frequency and number of multicasts.

In block 410, multicast information is added to each M3U8 file of each bitrate. For example, program server device 210 adds multicast information (e.g., inserts text) into the M3U8 file. The multicast information may include a multicast channel and a date and time of the multicast of the program. The multicast information may be based on the program schedule and/or user demand.

In block 415, each transport stream file of a bitrate is segmented based on an MTU of a network. Program server device 210 segments each transport stream file based on the multicast channel of mobile network 220. For example, program server device 210 may segment each transport stream file based on multiple sizes of MTUs, which may correspond to different mobile networks (e.g., CDMA, LTE, etc.).

In block 420, the segmented transport stream files and the modified M3U8 files are stored. For example, program server device 210 stores the segmented transport stream files and the modified M3U8 files, along with the manifest file, which pertain to the program.

In block 425, the manifest file is provided to a user device. Program server device 210 provides the manifest file and the M3U8 files for any bitrate to user device 150. For example, the program server of user device 150 and/or the program player of user device 150 may obtain the manifest file and the M3U8 file for a particular bitrate, upon request.

In block 430, the segmented transport stream files are multicast based on the multicast information. For example, program server device 220 multicasts the program to program servers of user devices 150 based on the multicast information.

Although FIG. 4 illustrates an exemplary process 400, according to other embodiments, process 400 may include additional operations, fewer operations, and/or different operations than those illustrated in FIG. 4 and described. For example, program server device 220 may unicast a program or one or multiple transport stream files to user devices 150, as previously described.

Figure 5A:
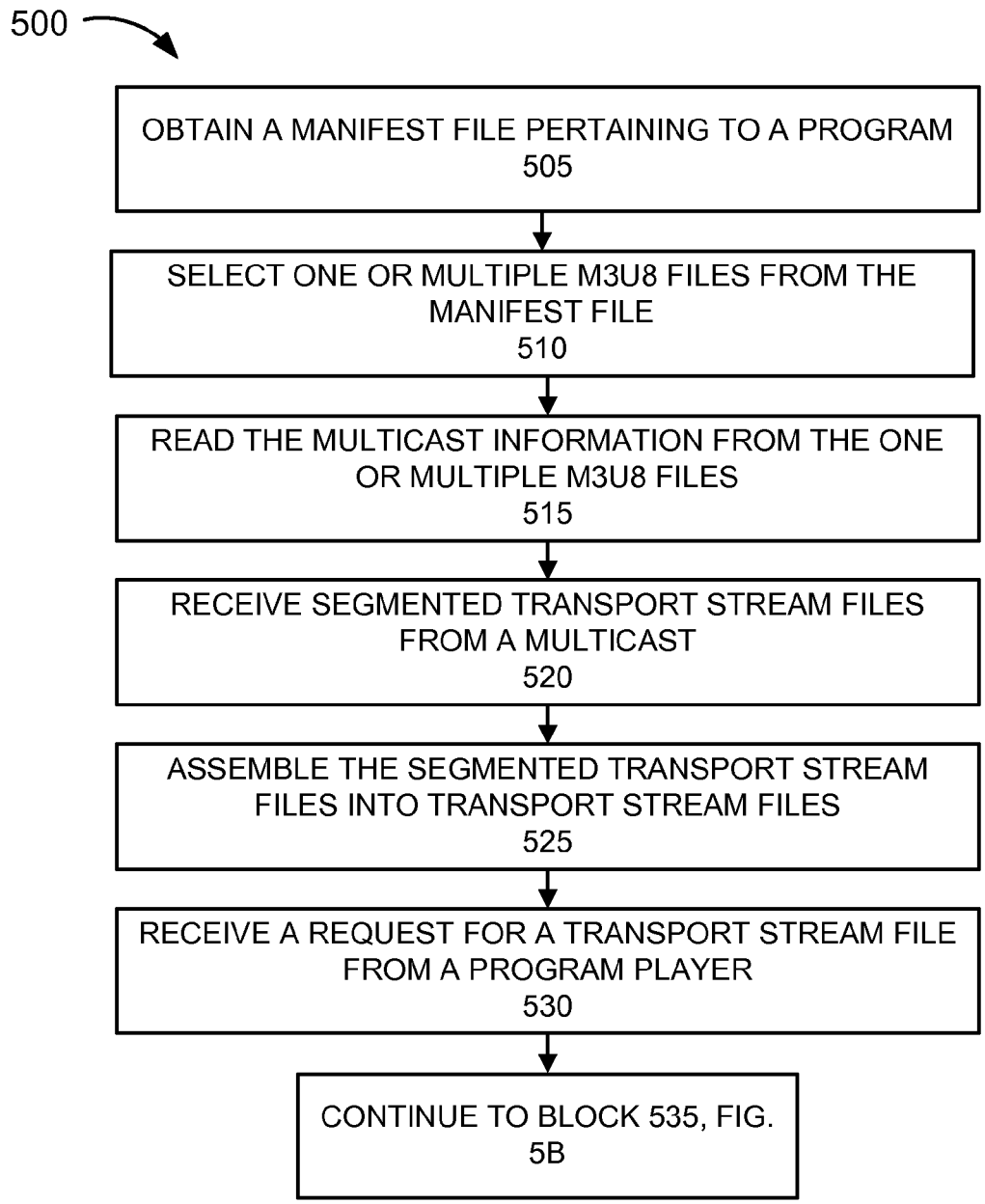
FIGS. 5A and 5B are flow diagrams that illustrate another exemplary process pertaining to the multicast and unicast adaptive bitrate services.
Figure 5B:
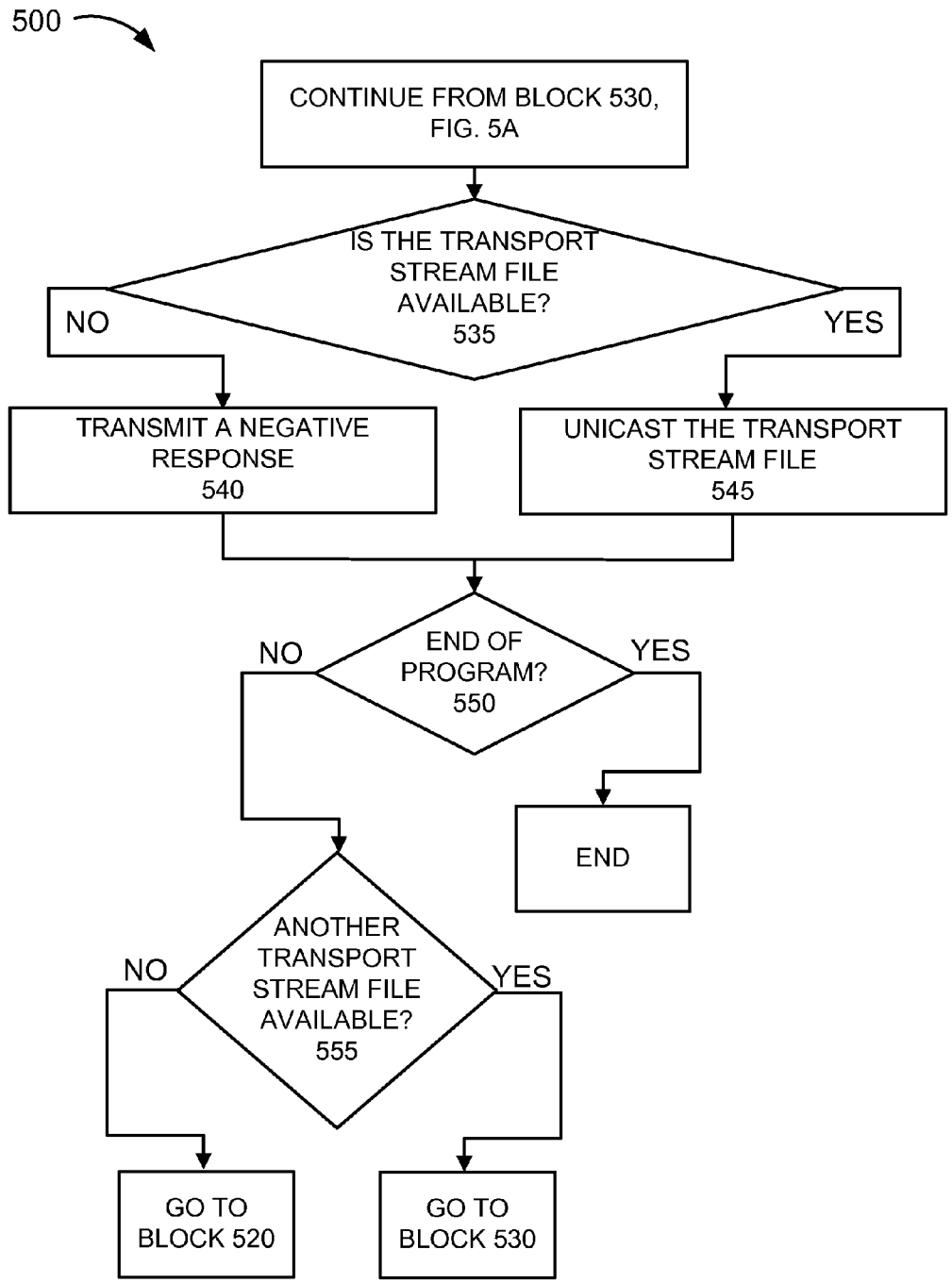

FIGS. 5A and 5B are flow diagrams illustrating another exemplary process 500 pertaining to the multicast and unicast adaptive bitrate services. Process 500 is directed to a process previously described above with respect to FIGS. 2A-2G and elsewhere in this description, in which user device 150 receives transport stream files from a multicast via an HTTP-based adaptive bitrate streaming session and provides an HTTP-based unicast delivery to a program player. As previously described, various types of programs, such as linear television programs, live programs, video-on-demand programs, pay-per-view programs, etc., may be multicasted to users based on an HTTP-based adaptive bitrate streaming delivery. According to an exemplary embodiment, a program server of user device 150 performs one or more of the steps described in process 500. For example, processor 305 of a mobile device executes software 315 to perform the steps described.

Referring to FIG. 5A, in block 505, a user device obtains a manifest file pertaining to a program. For example, the program server of user device 150 obtains the manifest file pertaining to a program selected by or recommended for a user of user device 150. As previously described, an exemplary manifest file lists identifiers (e.g., names) of M3U8 files and their corresponding bandwidths and/or bitrates.

In block 510, one or multiple M3U8 files are selected from the manifest file. For example, the program server of user device 150 selects an M3U8 file and corresponding bandwidth and/or bitrate, from the manifest file, based on a measured maximum bandwidth pertaining to a connection with the mobile network 220. For example, a program player of user device 150 may communicate the maximum bandwidth to the program server of user device 150. Alternatively, the program server of user device 150 may select one or multiple M3U8 files based on other information (e.g., historical bitrate information, location of user device 150, and/or other policies).

In block 515, the multicast information is read from the one or multiple M3U8 files. For example, the program server of user device 150 reads the multicast information from the M3U8 file. In this way, the program server of user device 150 is able to receive the segmented transport stream files of a particular bit rate from a multicast provided by program server device 210.

In block 520, segmented transport stream files are received from a multicast. For example, the program server of user device 150 joins a multicast pertaining to a particular bitrate of the program based on the multicast information. The program server of user device 150 receives the segmented transport stream files from program server device 210.

In block 525, the segmented transport stream files are assembled into transport stream files. For example, the program server of user device 150 assembles the segmented transport stream files of the particular bitrate into transport stream files. The program server of user device 150 stores the assembled transport stream files.

In block 530, a request for a transport stream file is received from a program player. For example, the program server of user device 150 receives a request from the program player of user device 150 for a transport stream file of a particular bit rate.

Referring to FIG. 5B, it is determined whether the transport stream file is available (block 535). For example, the program server of user device 150 searches the stored transport stream files to determine whether the requested transport stream file is available.

When it is determined that the requested transport stream file is not available (block 535—NO), a negative response is transmitted (block 540). For example, the program server of user device 150 indicates to the program player of user device 150 that the requested transport stream file is not available. When it is determined that the requested transport stream file is available (block 535—YES), the requested transport stream file is unicasted (block 545). For example, the program player of user device 150 unicasts the requested transport stream to the program player of user device 150 using HTTP.

In block 550, it is determined whether the program has ended. For example, the program server of user device 150 determines whether there are additional transport stream files to obtain for the program. For example, the program server of user device 150 may use information included in the M3U8 file to identify a last transport stream file (e.g., by name, etc.). When it is determined that the program has not ended (block 550—NO), it is determined whether another transport stream file is available (block 555). For example, the program server of user device 150 may determine whether one or a certain number of other transport stream files are stored that correspond to a next sequence of one or multiple transport stream files for the program.

When it is determined that there is not another transport stream file available (block 555—NO), then process 500 returns to block 520. For example, the program player of user device 150 tunes to the multicast pertaining to a particular bitrate of the program based on the multicast information. The program server of user device 150 receives the segmented transport stream files from program server device 210. The program server of user device 150 may receive maximum bandwidth information from the program player of user device 150. The program server of user device 150 may use the maximum bandwidth information to select the appropriate bitrate, etc.

When it is determined that there is another transport stream file available (block 555—YES), then process 500 returns to block 530. For example, the program server of user device 150 receives another request from the program player of user device 150 for another transport stream file.

Referring back to block 550, when it is determined that the program has ended (block 550—YES), the process 500 ends. For example, the program server of user device 150 ends the multicast session with program server device 210. The program server of user device 150 also ends communication with the program player of user device 150.

Although FIGS. 5A and 5B illustrate an exemplary multicast and unicast adaptive bitrate services process 500, according to other embodiments, process 500 may include additional operations, fewer operations, and/or different operations than those illustrated in FIGS. 5A and 5B and described herein. For example, the program server of user device 150 may not unicast the transport stream file to the program player. Rather, for example, the program server of user device 150 may store the transport stream files in a local memory or other storage area. The local memory or storage area may be a buffer used by the program player of user device 150.

Figure 6A:
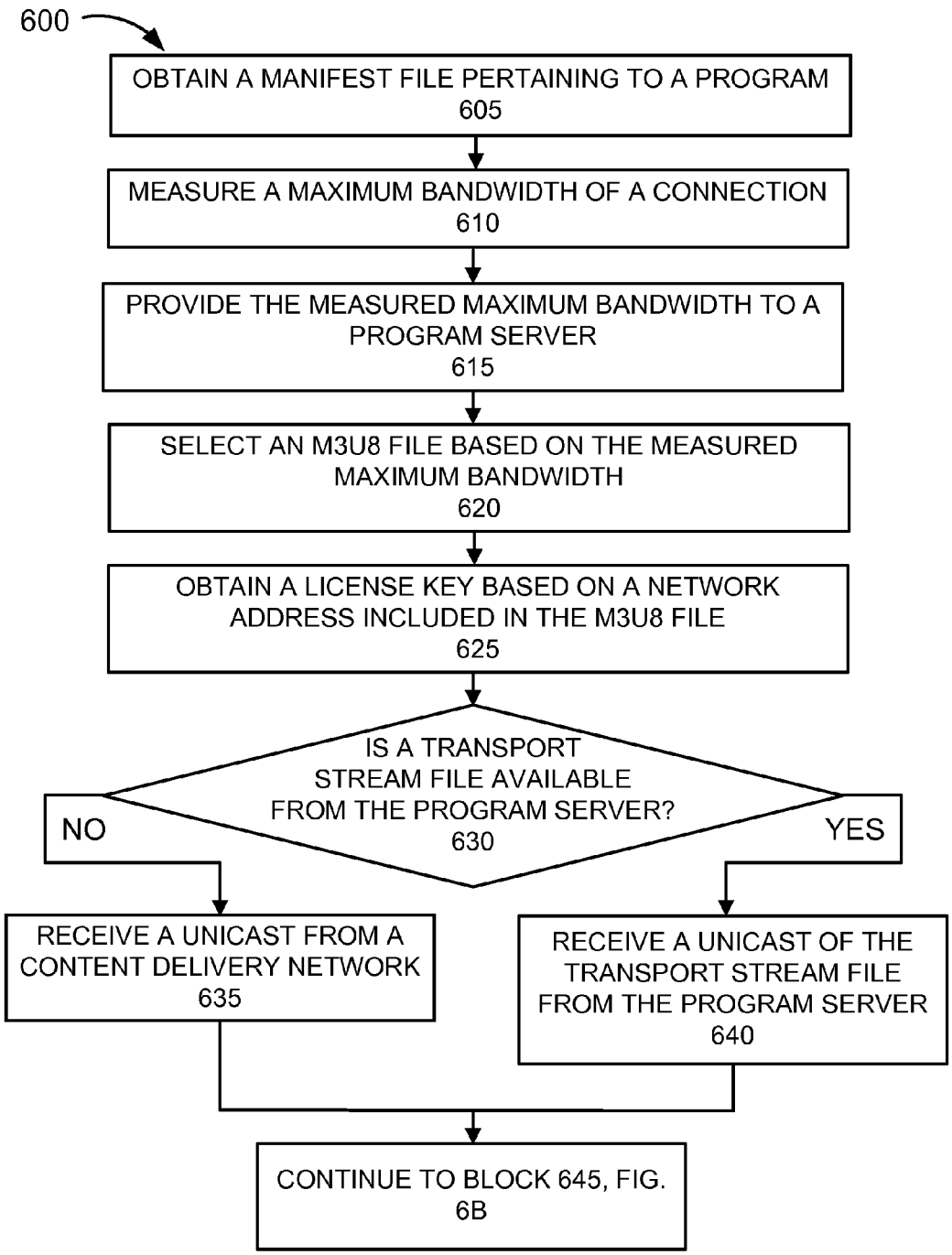
FIGS. 6A and 6B are flow diagrams that illustrate yet another exemplary process pertaining to the multicast and unicast adaptive bitrate services.
Figure 6B:
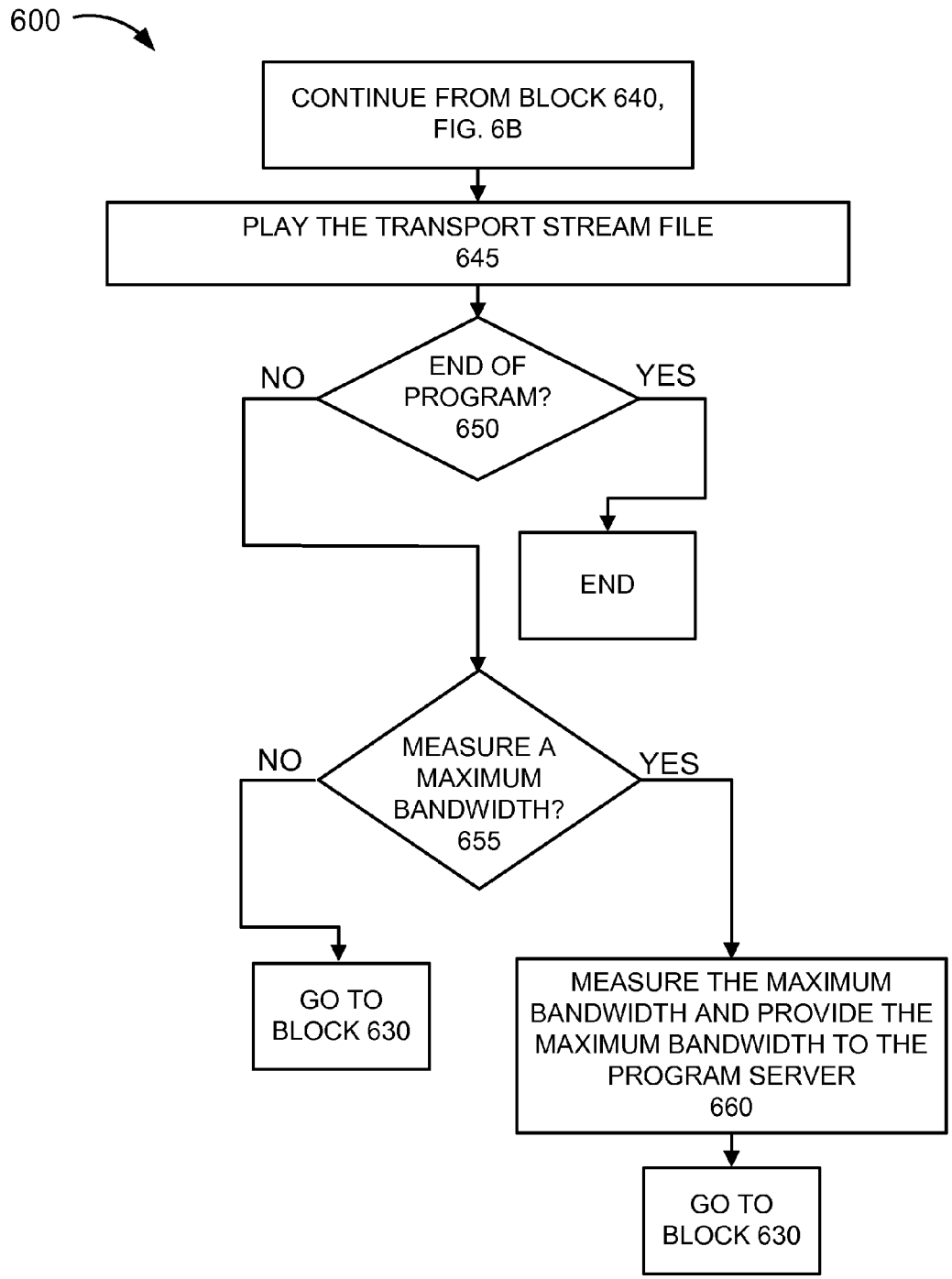

FIGS. 6A and 6B are flow diagrams illustrating yet another exemplary process 600 pertaining to the multicast and unicast adaptive bitrate services. Process 600 is directed to a process previously described above with respect to FIGS. 2A-2G and elsewhere in this description, in which user device 150 receives transport stream files of a multicast via an HTTP-based adaptive bitrate streaming session and provides an HTTP-based unicast delivery to a program player. As previously described, various types of programs, such as linear television programs, live programs, video-on-demand programs, pay-per-view programs, etc., may be multicasted to users based on an HTTP-based adaptive bitrate streaming delivery. According to an exemplary embodiment, a program player of user device 150 performs one or more of the steps described in process 600. For example, processor 305 of a mobile device executes software 315 to perform the steps described.

Referring to FIG. 6A, in block 605, a user device obtains a manifest file pertaining to a program. For example, the program player of user device 150 obtains the manifest file pertaining to a program selected by or recommended for a user of user device 150.

In block 610, a maximum bandwidth of a connection is measured. For example, the program player of user device 150 may measure various metrics to calculate the maximum bandwidth based on conventional methodologies, tools, etc.

In block 615, the measured maximum bandwidth is provided to a program server. For example, the program player of user device 150 communicates one or multiple values indicating the measured maximum bandwidth to the program server of user device 150.

In block 620, an M3U8 file is selected based on the measured maximum bandwidth. For example, the program player of user device 150 selects an M3U8 file and corresponding bandwidth and/or bitrate, from the manifest file, based on the measured maximum bandwidth pertaining to a connection with the mobile network 220.

In block 625, a license key is obtained based on a network address included in the M3U8 file. For example, an exemplary M3U8 file includes a network address or Uniform Resource Identifier (URI) for license server device 215. By way of further example, the URI may include a location of a license key for the program and corresponding transport stream files.

It is determined whether a transport stream file is available from the program server (block 630). For example, the program player of user device 150 communicates to the program server of user device 150 to obtain the transport stream file pertaining to the program. For example, as transport stream files are buffered for playback, the program player may seek to obtain the transport stream files from the program server of user device 150 before content delivery network 105. The communication between the program player and the program server may include a request and a response exchange or other suitable communication exchange.

When it is determined that the transport stream file is not available from the program server (block 630—NO), a unicast of the transport stream file is received from a content delivery network (block 635). For example, when the program player determines that the program server of user device 150 does not have the transport stream file (e.g., based on a communication from the program server), the program player of user device 150 receives the transport stream file from program server device 210 via an HTTP unicast session. By way of further example, the program player of user device 150 may transmit a request (e.g., directly or via the program server of user device 150) to program server device 210. The request includes data that includes an identifier of the transport stream file and an identifier of the program.

When it is determined that the transport stream file is available from the program server (block 630—YES), a unicast of the transport stream file is received from the program server (block 640). For example, when the program player determines that the program server of user device 150 has the transport stream file (e.g., based on a communication from the program server), the program player of user device 150 receives the transport stream file from the program server of user device via an HTTP unicast.

Referring to FIG. 6B, in block 645, the transport stream file is played. For example, the program player of user device 150 plays the transport stream file. For example, the program player may play this portion of a movie or a song.

In block 650, it is determined whether the program has ended. For example, the program player of user device 150 determines whether there are additional transport stream files to obtain for the program. By way of example, the program player of user device 150 may identify a last transport stream file.

When it is determined that the program has not ended (block 650—NO), it is determined whether to measure a maximum bandwidth (block 655). For example, the program player of user device 150 may provide a maximum bandwidth to the program server of user device 150 based on a triggering event. For example, the triggering event may be time-based (e.g., periodically, such as every minute, etc.), a number of times the program server did not have a transport stream file, a number of times a transport stream file had an error that was not correctable, an analysis of the maximum bandwidth signature (e.g., steady state, erratic, etc.), etc.

When it is determined not to measure the maximum bandwidth (block 655—NO), the process 600 continues to block 630. For example, as previously described, the program player of user device 150 communicates to the program server of user device 150 to obtain the transport stream file pertaining to the program. Based on the communication, the program player determines whether the transport stream file is available from the program server of user device 150.

When it is determined to measure the measure maximum bandwidth (block 655—YES), the maximum bandwidth is measured and provided to the program server (block 660). For example, the operations previously described in relation to blocks 610 and 615 are performed. Thereafter, process 600 continues to block 630.

Referring back to block 650, when it is determined that the program has ended (block 650—YES), process 600 ends. For example, the program player of user device 150 ends communication with the program server of user device 150 after playback of a last transport stream file. The playback of the last transport stream file may be based on user input (e.g., a stop command, a closing of the program player, etc.).

Although FIGS. 6A and 6B illustrate an exemplary multicast and unicast adaptive bitrate services process 600, according to other embodiments, process 600 may include additional operations, fewer operations, and/or different operations than those illustrated in FIGS. 6A and 6B and described herein. For example, the program player of user device 150 may not receive a unicast of the transport stream file from the program server of user device 150. Rather, the program player of user device 150 may perform a fetch (e.g., from a local memory) of the transport stream files. The program player of user device 150 may load the transport stream files into a buffer. Alternatively, the program server of user device 150 may store the transport stream files into the buffer.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4, 5A, 5B, 6A, and 6B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings.

However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 305) of a computational device. A non-transitory storage medium includes one or more of the storage mediums described in relation to memory/storage 310.

No element, act, or instruction described in the present application should be construed as critical or essential to the embodiments described herein unless explicitly described as such.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A method comprising:
   receiving, by a network device of a content delivery network, program data of programs available to users of an adaptive bitrate service, wherein the programs include linear television programs, video-on-demand programs, and pay-per-view programs;
   receiving, by the network device, a manifest file that includes a list of bitrates for a program and names of M3U8 files, and each of the M3U8 files includes a list of transport stream files of one of the bitrates pertaining to the program, wherein the program is one of the programs;
   storing, by the network device, the manifest file and the M3U8 files;
   selecting, by the network device, the M3U8 files based on the manifest file;
   determining, by the network device, whether a minimum number of user requests for the program are received;
   adding, by the network device, multicast information to each selected M3U8 file in response to determining that the minimum number of user requests for the program is received, wherein the multicast information indicates a multicast channel and a date and a time of a multicast of the program;
   segmenting, by the network device, the program data of the program, wherein the program data includes transport stream files and the transport stream files are segmented based on the multicast information and a maximum transmission unit of the multicast channel provided by a wireless network of the multicast;
   providing, by the network device, the manifest file and one or more of the M3U8 files pertaining to the program, to a user device, upon request; and
   multicasting, by the network device, a segmented program data via the wireless network based on the multicast information, wherein the multicasting includes the adaptive bitrate streaming service.

2. The method of claim 1, further comprising:
   obtaining, by a program server of the user device, the manifest file from the network device;
   selecting, by the program server of the user device, the one or more of the M3U8 files based on a reading of the manifest file;
   reading, by the program server of the user device, the multicast information indicated in each of the one or more of the M3U8 files; and
   joining, by the program server of the user device, the multicast based on the multicast information.

3. The method of claim 2, further comprising:
   receiving, by the program server of the user device, maximum bandwidth information pertaining to a connection with the wireless network, from a program player of the user device; and
   selecting one of the bitrates and one of the M3U8 files based on the maximum bandwidth information, and wherein the joining comprises:
   joining the multicast based on the multicast information included in the one of the M3U8 files.

4. The method of claim 2, wherein the program is a pay-per-view program or a video-on-demand program, and wherein the joining comprises:
   calculating a wait time period for joining the multicast;
   determining whether the wait time period is shorter than a threshold wait time period; and
   joining the multicast when the wait time period is shorter than the threshold wait time period.

5. The method of claim 2, further comprising:
   receiving, by the program server of the user device, the segmented program data; and
   assembling, by the program server of the user device, the segmented program data into transport stream files of the program;
   receiving, by the program server of the user device, a request for the transport stream files of the program, from a program player of the user device;
   determining whether the transport stream files are available; and
   unicasting, by the program server of the user device, the transport stream files, to the program player of the user device, based on determining that the transport stream files are available.

6. The method of claim 5, further comprising:
   transmitting, by the program player of the user device, a request for other transport stream files of the program, to the program server of the program;
   receiving, by the program player of the user device, a response, from the program server, that indicates that one or more of the other transport stream files are not available; and
   receiving, by the program player of the user device, the one or more of the other transport stream files from the network device of the content delivery network, wherein the network device unicasts the one or more of the other transport stream files.

7. The method of claim 6, further comprising:
transmitting, by the program player of the user device, a request for still other transport stream files of the program, to the program server of the program;
receiving, by the program player of the user device, the still other transport stream files of the program;
determining, by the program player of the user device, that one or more of the still other transport stream files have uncorrectable errors; and
receiving, by the program player of the user device, the one or more of the still other transport stream files from the network device of the content delivery network, wherein the network device unicasts the one or more of the still other transport stream files.

8. A system comprising:
a network device comprising:
   a first communication interface;
   a first memory, wherein the first memory stores first instructions; and
   a first processor, wherein the first processor executes the first instructions to:
      receive, via the first communication interface, program data of programs available to users of an adaptive bitrate service, wherein the programs include linear television programs, video-on-demand programs, and pay-per-view programs;
      receive, via the first communication interface, a manifest file that includes a list of bitrates for a program and names of M3U8 files, and each of the M3U8 files includes a list of transport stream files of one of the bitrates pertaining to the program, wherein the program is one of the programs;
      store the manifest file and the M3U8 files;
      select the M3U8 files based on the manifest file;
      determine whether a minimum number of user requests for the program are received;
      add multicast information to each selected M3U8 file in response to a determination that the minimum number of user requests for the program is received, wherein the multicast information indicates a multicast channel and a date and a time of a multicast of the program;
      segment the program data of the program, wherein the program data includes transport stream files and the transport stream files are segmented based on the multicast information and a maximum transmission unit of the multicast channel provided by a wireless network of the multicast;
      provide the manifest file and one or more of the M3U8 files pertaining to the program, to a user device, upon request; and
      multicast a segmented program data via the wireless network based on the multicast information, wherein a multicasting includes the adaptive bitrate streaming service.

9. The system of claim 8, further comprising a user device, the user device comprising:
a second communication interface;
a second memory, wherein the second memory stores second instructions, and wherein the second instructions include a program player and a program server; and
a second processor, wherein the second processor executes the second instructions to:
   obtain, by the program server, the manifest file from the network device;
   read, by the program server, the manifest file;
   select, by the program server, the one or more of the M3U8 files based on a reading of the manifest file;
   read, by the program server, the multicast information indicated in each of the one or more of the M3U8 files; and
   join, by the program server, the multicast based on the multicast information.

10. The system of claim 9, wherein the second processor further executes the second instructions to:
receive, by the program server, maximum bandwidth information pertaining to a connection with the wireless network, from the program player; and
select, by the program server, one of the bitrates and one of the M3U8 files based on the maximum bandwidth information, and wherein when joining the multicast, the second processor further executes the second instructions to:
join, by the program server, the multicast based on the multicast information included in the one of the M3U8 files.

11. The system of claim 9, wherein the program is a pay-per-view program or a video-on-demand program, and wherein when joining, the second processor further executes the second instructions to:
calculate, by the program server, a wait time period for joining the multicast;
determine, by the program server, whether the wait time period is shorter than a threshold wait time period; and
join, by the program server, the multicast when the wait time period is shorter than the threshold wait time period.

12. The system of claim 9, wherein the second processor further executes the second instructions to:
receive, via the second communication interface by the program server, the segmented program data; and
assemble, by the program server, the segmented program data into transport stream files of the program;
receive, by the program server, a request for the transport stream files of the program, from the program player;
determine, by the program server, whether the transport stream files are available; and
unicast, by the program server, the transport stream files, to the program player, based on a determination that the transport stream files are available.

13. The system of claim 12, wherein the second processor further executes the second instructions to:
transmit, by the program player, a request for other transport stream files of the program, to the program server of the program;
receive, by the program player, a response, from the program server, that indicates that one or more of the other transport stream files are not available; and
receive, via the second communication interface and by the program player, the one or more of the other transport stream files from the network device, wherein the network device unicasts the one or more of the other transport stream files.

14. The system of claim 12, wherein the second processor further executes the second instructions to:
transmit, by the program player, a request for other transport stream files of the program, to the program server of the program;
receive, by the program player, the other transport stream files in response to the request;
determine, by the program player, that one or more of the other transport stream files of the program have uncorrectable errors; and receive, via the second communication interface and by the program player, the one or more of the other transport stream files from the network device, wherein the network device unicasts the one or more of the other transport stream files.

15. The system of claim 9, wherein the program is a pay-per-view program or a video-on-demand program, and wherein when joining, the second processor further executes the second instructions to:
calculate, by the program server, a wait time period for joining the multicast;
determine, by the program server, whether the wait time period is shorter than a threshold wait time period;
receive, by the program server, a portion of the program from the network device via a unicast based on a determination that the wait time period is greater than the threshold wait time period;
receive, by the program server, user activity information pertaining to the playing of the program;
determine, by the program server, whether to switch from the unicast to the multicast based on the user activity information and the multicast information; and
join, by the program server, the multicast based on a determination to switch from the unicast to the multicast.

16. The system of claim 15, wherein when determining whether to switch, the second processor further executes the second instructions to:
calculate, by the program server, a current time window of playback of the program relative to the multicast and a current position of playback of the program by a user of the program player.

17. A non-transitory, computer-readable storage medium storing instructions executable by a processor of a computational device, which when executed cause the computational device to:
receive program data of programs available to users of an adaptive bitrate service, wherein the programs include linear television programs, video-on-demand programs, and pay-per-view programs;
receive a manifest file that includes a list of bitrates for a program and names of M3U8 files, and each of the M3U8 files includes a list of transport stream files of one of the bitrates pertaining to the program, wherein the program is one of the programs;
select the M3U8 files based on the manifest file;
add multicast information to each selected M3U8 file in response to a determination that the minimum number of user requests for the program is received, wherein the multicast information indicates a multicast channel and a date and a time of a multicast of the program;
segment the program data of the program, wherein the program data includes transport stream files and the transport stream files are segmented based on the multicast information and a maximum transmission unit of the multicast channel provided by a wireless network of the multicast;
store the manifest file and the M3U8 files pertaining to the program; and
provide the manifest file and one or more of the M3U8 files pertaining to the program, to a user device, upon request.

18. The non-transitory, computer-readable storage medium of claim 17, further storing instructions executable by the processor of the computational device, which when executed cause the computational device to:
multicast a segmented program data via the wireless network to the user device based on the multicast information, wherein a multicasting includes the adaptive bitrate streaming service.

19. The non-transitory, computer-readable storage medium of claim 17, further storing instructions executable by the processor of the computational device, which when executed cause the computational device to:
unicast one or more transport stream files corresponding to at least a portion of a segmented program data in response to a request, from the user device.

20. The non-transitory, computer-readable storage medium of claim 17, further storing instructions executable by the processor of the computational device, which when executed cause the computational device to:
store maximum transmission unit information that indicates a maximum transmission unit of multicast channels for multiple types of wireless networks; and
use the maximum transmission unit information to segment the program data.

* * * * *